(12) United States Patent  
Koganehira

(10) Patent No.: US 8,702,226 B2  
(45) Date of Patent: Apr. 22, 2014

(54) INKJET RECORDING METHOD

(75) Inventor: Shuichi Koganehira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 139 days.

(21) Appl. No.: 13/300,016

(22) Filed: Nov. 18, 2011

(65) Prior Publication Data

US 2012/0127248 A1 May 24, 2012

(30) Foreign Application Priority Data

Nov. 18, 2010 (JP) ................................. 2010-258042

(51) Int. Cl.
B41J 2/01 (2006.01)

(52) U.S. Cl.
USPC .......................................... 347/102; 347/101

(58) Field of Classification Search
None
See application file for complete search history.

(56) References Cited

U.S. PATENT DOCUMENTS

| | | | | |
|---|---|---|---|---|
| 6,126,962 | A * | 10/2000 | Chaen et al. ................ | 424/442 |
| 2003/0157287 | A1* | 8/2003 | Song ........................... | 428/40.1 |
| 2006/0196390 | A1 | 9/2006 | Rehman et al. | |
| 2007/0229577 | A1 | 10/2007 | Morimoto | |
| 2009/0233065 | A1* | 9/2009 | Komatsu ..................... | 428/195.1 |
| 2009/0308279 | A1 | 12/2009 | Koganehira et al. | |
| 2010/0075043 | A1* | 3/2010 | Kaimoto et al. ............. | 427/256 |

FOREIGN PATENT DOCUMENTS

| | | |
|---|---|---|
| JP | 2003-213179 A | 7/2003 |
| JP | 2003-253167 A | 9/2003 |
| JP | 2005-088238 A | 4/2005 |
| JP | 2005-194500 A | 7/2005 |
| JP | 2006-249429 A | 9/2006 |
| JP | 2007-261206 A | 10/2007 |
| JP | 2009-269964 A | 11/2009 |
| JP | 2009-286998 A | 12/2009 |
| JP | 2010-000691 A | 1/2010 |
| JP | 2010-115854 A | 5/2010 |

* cited by examiner

Primary Examiner — Jason Uhlenhake
Assistant Examiner — Alexander C Witkowski
(74) Attorney, Agent, or Firm — Nutter McClennen & Fish LLP; John J. Penny, V

(57) ABSTRACT

An inkjet recording method using a clear ink composition includes processes of applying the clear ink composition and of heating the applied clear ink composition, wherein the clear ink composition contains an amino group-containing resin, water, a sparingly water soluble alkanediol, and a wetting agent which is solid at 20° C. and 60% relative humidity.

6 Claims, 1 Drawing Sheet

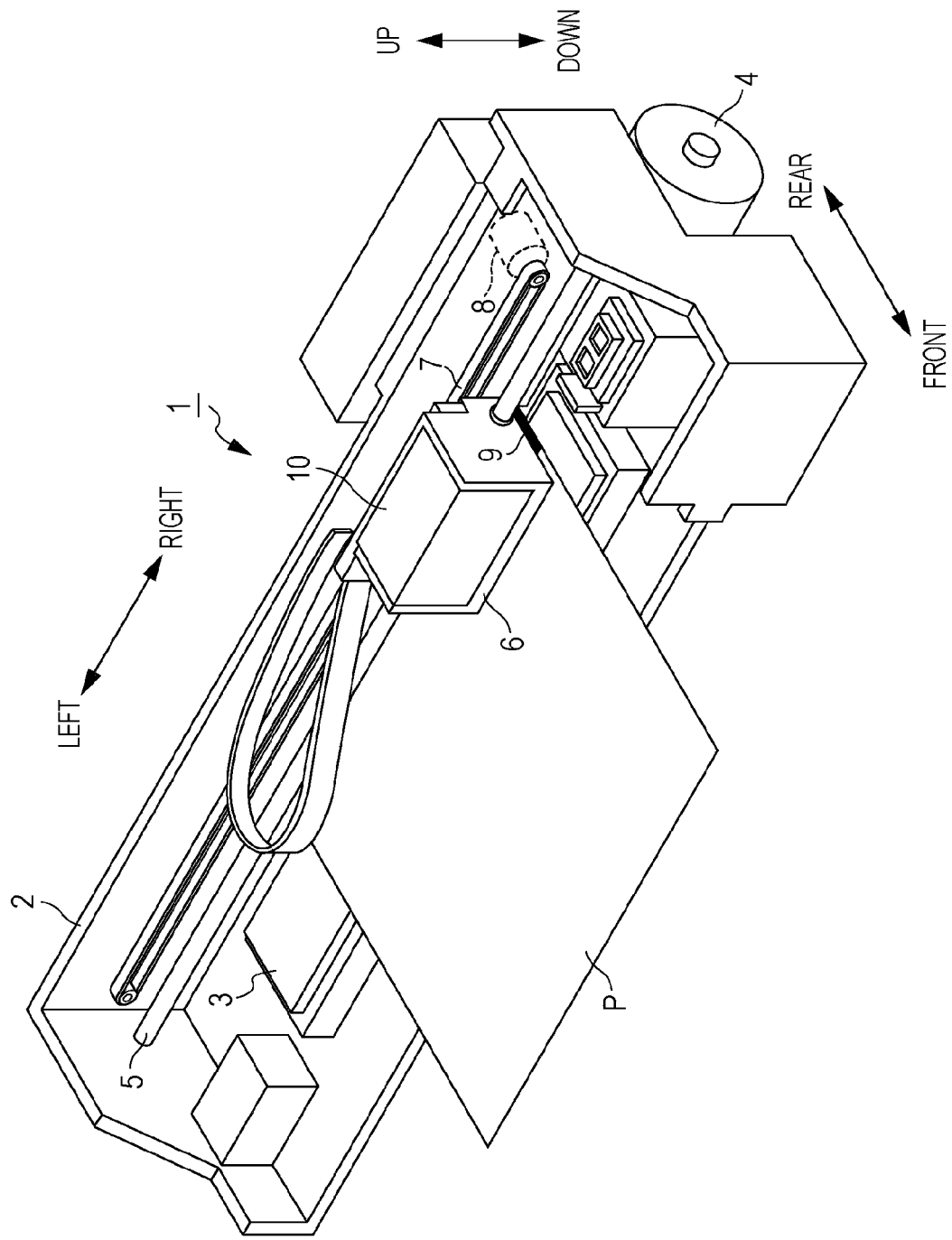

INKJET RECORDING METHOD

The entire disclosure of Japanese Application No.: 2010-258042 filed on Nov. 18, 2010 is expressly incorporated by reference herein.

BACKGROUND

1. Technical Field

The present invention relates to an inkjet recording method capable of obtaining a high quality image.

2. Related Art

An ink jet recording method is a printing process for printing by letting ink droplets fly and attach to a recording medium such as paper. According to recent innovative progress in ink jet recording technology, the ink jet recording method has been also used in the field of highly fine printing that was achieved by silver halide photography or offset printing before. With this, an ink for ink jet recording has been developed so that an image having glossiness similar to that achieved by silver halide photography can be formed by the ink jet recording on so-called exclusive paper, which is a recording medium having high gloss being equal to that of photographic paper or art paper used in the fields of silver halide photography and offset printing. In addition, ink for ink jet recording that can achieve an image quality, even on plain paper, similar to that achieved by silver halide photography has been developed.

Incidentally, desk top publishing (DTP) has been spreading in recent years, in particular, in the printing field, with technology for forming an image from digital data becoming widespread. Even when printing is carried out by DTP, a proof for color proofing is preliminarily prepared in order to confirm the glossiness and color impression of the actual printed matter. The ink jet recording system is applied to the output of the proof, and exclusive paper for ink jet recording is usually used as the recording medium since high color reproducibility and high color stability of the printed matter are required in DTP.

A proof sheet, which is exclusive paper for ink jet recording, is produced so as to exhibit glossiness and color impression similar to those of the actual output printed on printing paper. Thus, the material of the exclusive paper is properly adjusted depending on the type of printing paper. However, production of exclusive paper that can correspond to all of the various types of printing paper causes an increase in manufacturing cost. Accordingly, in application to color proofing, it is desired, from the technical viewpoint, to conduct ink jet recording on printing paper rather than on exclusive paper. Furthermore, if it is possible to conduct ink jet recording directly on printing paper, not on exclusive paper, for providing a final proof sample, this can significantly decrease the cost of the proof and therefore is desired from the economical viewpoint. In addition, synthetic paper prepared by mixing an inorganic filler and the like with a polyethylene resin, a polypropylene resin or a polyester resin and then forming the mixture into a film with a void structure is widely used in the printing field. The synthetic paper is excellent in recyclability and thereby has recently received widespread attention as an environment-friendly material. It is desired to record on such synthetic paper, from the environmental viewpoint. Further, for the purpose of outdoor advertisement, it is desired to record on a plastic film which does not have a void structure.

The printing paper is a coated paper having a coating layer on the surface for receiving oil-based ink and has a characteristic that the coating layer is poor in ink-absorbing ability against aqueous ink on the coating layer. Therefore, in the use of aqueous pigment ink, which is usually used in ink jet recording, bleeding or beading unevenness may occur in an image because of low permeability of the ink into the recording medium (printing paper). Further, with respect to not only a plastic film which does not have a void structure but a synthetic paper which has a void structure, bleeding or beading unevenness may occur in an image because of a poor ink-absorbing capacity against an aqueous ink on the coating layer.

In view of the above-mentioned problems, for example, JP-A-2005-194500 discloses a pigment ink that has decreased bleeding and also excellent gloss with exclusive paper by including a polysiloxane compound as a surfactant and an alkanediol, such as 1,2-hexanediol, as a solubilization aid. In addition, JP-A-2003-213179, JP-A-2003-253167, or JP-A-2006-249429 proposes that permeability of ink into a recording medium is controlled by adding glycerin, a diol such as 1,3-butanediol or a triol alcohol solvent such as pentanetriol to the ink for forming a high-quality image.

In JP-A-2009-286998 and JP-A-2009-269964, an ink composition which can obtain a high quality image and suppress occurrence of curl is proposed.

JP-A-2005-88238 proposes a liquid composition which contains a modified polyamine but does not contain a colorant, in which the composition is capable of a good cleaning operation with good color and glossiness, and is adhered on a recording medium with an ink composition, however, which is completely different from the ink composition used in the recording method of the invention, from the viewpoint of configuration and effect.

JP-A-2007-261206 provides an ink set which is capable of achieving high fixability, or securing optical density and preventing bleeding at high speed printing, and describes that the ink set contains polyallylamine, however, which is completely different from the ink composition used in the recording method of the invention.

JP-A-2010-691 provides an inkjet recording method where a line head is used and there is excellent color bleeding resistance and describes that a fixing liquid used in the recording method contains polyallylamine, which is completely different from the ink composition used in the recording method of the invention.

JP-A-2010-115854 discloses a printing method including processes of drying, and applying a color ink, a resin ink and a reaction ink, to print an image and describes that the reaction ink used in the printing method contains polyallylamine, which is completely different from the ink composition used in the recording method of the invention.

The present inventors have found that a high-quality image free of bleeding or beading can be formed, in particular, with excellent granularity and curl suppression even in a case of use of various recording media, in particular, a non- or low absorbable recording medium, by using an inkjet recording method using a clear ink composition, which includes processes of applying a clear ink composition and of heating the applied clear ink composition, in which the clear ink composition contains an amino group-containing resin, water, a sparingly water soluble alkanediol, and a wetting agent which is solid at 20° C. and 60% relative humidity.

SUMMARY

An advantage of some aspects of the invention is to provide an inkjet recording method capable of realizing a high-quality image free of bleeding or beading, with excellent granularity and curl suppression even in a case of use of various recording media, in particular, a non- or low absorbable recording medium.

An inkjet recording method according to an aspect of the present invention is an inkjet recording method using a clear ink composition which includes processes of applying a clear ink composition and of heating the applied clear ink composition, in which the clear ink composition contains an amino group-containing resin, water, a sparingly water soluble alkanediol, and a wetting agent which is solid at 20° C. and 60% relative humidity.

In a case of using the inkjet recording method of the invention, a high-quality image free of bleeding or beading can be formed, in particular, with excellent granularity and curl suppression even in a case of use of various recording media, in particular, a non- or low absorbable recording medium.

BRIEF DESCRIPTION OF THE DRAWINGS

FIGURE shows an inkjet type printer as a recording apparatus.

DESCRIPTION OF EXEMPLARY EMBODIMENTS

Definition

In the specification, the hydrocarbon moiety of alkanediol may be any of straight and branched chains.

Further, "water-soluble" means that the solubility in water at 20° C. (the amount of a solute in 100 g of water) is equal to or more than 10.0 g. "Sparingly water-soluble" means that the solubility in water at 20° C. (the amount of a solute in 100 g of water) is less than 1.0 g. "Miscible" means that a solution is dispersed or dissolved homogeneously without aggregation or phase separation when the amount of a solute in 100 g of water in terms of the solubility in water at 20° C. is 10.0 g.

Further, in the specification, "non- or low absorbable recording medium" means a recording medium having no or an insufficient aqueous ink-receptive layer. More quantitatively, a non- or low absorbable recording medium means that a recording plane is a recording medium where a water absorption amount to 30 $msec^{1/2}$ from the start of contact is equal to or less than 10 $mL/m^2$ in a Bristow method. The Bristow method is a method for measuring a liquid absorption amount for a short time, which has been widely used and is also used in JAPAN TAPPI. Details of the testing method is described in "Paper and plate paper-liquid absorption test method-Bristow method" of JAPAN TAPPI Paper Pulp Test Method (2002) No. 51.

Inkjet Recording Method

The inkjet recording method of the invention is an inkjet recording method using a clear ink composition which includes processes of applying a clear ink composition and of heating the applied clear ink composition, in which the clear ink composition contains an amino group-containing resin, water, a sparingly water soluble alkanediol, and a wetting agent which is solid at 20° C. and 60% relative humidity. By using the inkjet recording medium of the invention, a high-quality image free of bleeding or beading can be formed, in particular, with excellent granularity and curl suppression even in a case of use of various recording media, in particular, a non- or low absorbable recording medium.

According to the inkjet recording method of the invention, including processes of applying a clear ink composition and of heating the applied clear ink composition, is not limited to following embodiments (i) and (ii), for example, (i) applying a clear ink composition, then heating the applied clear ink composition, (ii) applying a clear ink composition, and heating the applied clear ink composition which is performed at the same time or substantially at the same time. Of these embodiments, "applying a clear ink composition, and heating the applied clear ink composition which is performed at the same time or substantially at the same time" of (ii) is more preferable. A case where "applying a clear ink composition, and heating the applied clear ink composition which is performed at the same time or substantially at the same time" means that a start and finish time of coating of the clear ink composition is completely the same as a start and finish time of heating of the clear ink composition, as well as a time from start to finish when the clear ink composition is applied, being partially overlapping (for example, by a millisecond (a thousandth second)) with a time from start to finish when the clear ink composition is heated, which are included in embodiment of (ii).

Embodiment of (ii), for example, includes an embodiment where the recording medium with applied clear ink composition is heated, and the clear ink composition is applied at any time when the recording medium is heated. "Heating process of clear ink composition" includes not only directly heating the clear ink composition itself with warm air, but also for example indirectly heating the clear ink composition through a recording medium.

A heating process of the clear ink composition includes previously heating the recording medium or the like and heating the clear ink composition by residual heat. A case where the clear ink composition is heated by residual heat is included in embodiment of (ii), as long as the clear ink composition is applied by residual heat on the recording medium and the clear ink composition is heated even though a time from start to finish when heat is applied to the recording medium is not overlapping with a time from start to finish when the clear ink composition is applied.

As the heating unit of the invention, a heated platen 3 of FIGURE may have a function as a heater, or heating may be performed by radiation heat by heat rays or the like, a unit for feeding a warm air into a device, or superheated steam. Alternatively, known heating units may be used.

The heating process of the applied clear ink composition of the invention is not particularly limited as long as it has an effect of the invention, but it is preferably preformed at 30 to 160° C., and more preferably 35 to 75° C. By heating in such range, a high-quality image free of bleeding or beading can be formed, in particular, with excellent granularity or curl suppression even in a case of use of various recording media, in particular, a non- or low absorbable recording medium.

The recording method of the present invention may include a coating process of an ink composition containing the following colorant. In this case, an attachment order of the ink droplet on the recording medium is not specifically limited, but it is preferred that after droplets of the clear ink composition are attached on the recording medium, droplets of the ink composition containing the following colorant are attached on the recording medium. The clear ink composition is preferably attached such that a coverage of the clear ink composition to a region which is recorded by the ink composition containing the following colorant (hereinafter, simply referred to as coverage of clear ink) is 50 to 200%, and preferably 60 to 160%. By using this range, a high image quality can be formed. A coverage of the clear ink composition is a value obtained by multiplying an average dot area of the clear ink composition attached on a region which is recorded by the ink composition containing the following colorant by a dot number per 1 $inch^2$ of the ink composition thereof, which is divided by a unit area (that is to say, 1 inch$^2$) of a region which is recorded by the ink composition containing the following colorant, and is calculated by the following formula. Coverage (%)=(an average dot area of the clear ink composition attached on a region which is recorded by the ink composition containing the following colorant×dot number per 1 inch$^2$)/unit area (1 inch$^2$) of a region which is recorded by the ink composition containing the following colorant× 100 (wherein, "average dot area" means a circular area allowing calculation of a value of average dot size described below in terms of diameter). The clear ink composition is preferably homogeneously attached on a region which is recorded by the ink composition containing the following colorant.

The clear ink composition and recording medium used in the inkjet recording method of the invention will be described below.

Clear Ink Composition

The clear ink composition used in the inkjet recording method of the invention includes an amino group-containing resin, water, a sparingly water soluble alkanediol, and a specific wetting agent. By containing other components in addition to these components, an inkjet recording method can be provided where a high-quality image free of bleeding or beading can be formed, in particular, with excellent granularity and curl suppression even in a case of use of various recording media, in particular, a non- or low absorbable recording medium. By adding other components in combination with these components to the clear ink composition used in the inkjet recording method of the invention, highly precise image quality with small dot size during printing can be provided.

The clear ink composition used in the inkjet recording method of the invention refers to an ink composition substantially free of colorant, preferably a clear ink composition with impregnation action. A dot which is recorded by a clear ink composition with impregnation action has an effect of impregnating moisture into clear ink composition as such. The reason thereof is not clear, but it is thought that the impregnation action is provided in the clear ink composition by the wetting agent. The "substantially free of colorant" refers to completely not containing colorant in a clear ink composition or an amount less than 0.3% by mass.

In this specification, "beading" means density unevenness in similar colors that occurs locally when an image of one color is printed (for example, when a 6-inch square image of one color ("one color" means that the number of colors printed is one and two or more ink compositions may be used to realize that color) is printed), and does not mean that some of the recording medium surface remains uncoated with inks.

In the invention, occurrence of curling, i.e., curling of a recording medium with its printed surface at the inner side, can be suppressed, even when printing paper having a weight of 70 to 105 g/m$^2$ or more preferably PPC paper (plain paper), or the like having a weight of 60 to 210 g/m$^2$ is used as the recording medium.

It is thought that, beading of inks which occurs when recording is conducted on a recording medium is probably caused by ink droplets adhering on the recording medium which results in flow, in a case where ink has a surface tension higher than 24 mN/m. That is to say, it is thought that, beading is caused by an increased contact angle of ink droplets to the recording medium resulting in bouncing off of ink droplets. Therefore, a surface tension of ink should be reduced for beading suppression. However, when recording is conducted on a non- or low-absorbable recording medium, since water in an ink poses a difficulty in absorption, even an ink having a surface tension of 20 to 24 mN/m results in flow of ink droplets.

Further, a surface tension in the specification means a value determined using the Wilhelmy method. For example, a surface tension by the Wilhelmy method can be measured using an automatic surface tensiometer CBVP-Z (trade name, manufactured by Kyowa Interface Science Co., Ltd.).

Accordingly, in a non- or low absorbable recording medium, in order to suppress beading of inks, it is considered preferable to reduce the surface tension of the inks, as well as to suppress ink flowability after landing ink droplets onto a recording medium.

It is known that when ink is landed onto a recording medium, ink is spread into and wets the recording medium, which ink permeates into. Bleeding of inks which occurs when recording is conducted on a recording medium is probably caused by ink droplets adhering on the recording medium which results in flow, in a case where ink has a surface tension higher than 24 mN/m. That is to say, it is thought that, bleeding is caused since wettability of ink to the recording medium is reduced, and solvent in an ink does not infiltrate directly. Therefore, a surface tension of ink should be reduced for bleeding suppression. However, when recording is conducted on a non- or low-absorbable recording medium, since water in an ink poses a difficulty in permeation, even an ink having a surface tension of 20 to 24 mN/m results in flow of ink droplets.

Accordingly, in a non- or low absorbable recording medium, in order to suppress bleeding of inks, it is considered preferable to reduce the surface tension of the inks, as well as to suppress ink flowability after landing ink droplets onto a recording medium.

For the ink composition which is used in the inkjet recording method of the invention, an ink having a low surface tension and a low flowability of ink droplets after landing onto a recording medium is realized. As a result, bleeding and beading are effectively suppressed.

Sparingly Water-Soluble Alkanediol

The clear ink composition which is used in the inkjet recording method of the invention contains a sparingly water-soluble alkanediol.

According to a preferable embodiment of the invention, the sparingly water-soluble alkanediol is preferably an alkanediol having 7 or more carbon atoms, more preferably, an alkanediol having 7 to 10 carbon atoms, and even more preferably, a sparingly water-soluble 1,2-alkanediol, which can more effectively suppress beading. Examples of the sparingly water-soluble 1,2-alkanediol include 1,2-heptanediol, 1,2-octanediol, 5-methyl-1,2-hexanediol, 4-methyl-1,2-hexanediol, or 4,4-dimethyl-1,2-pentanediol. Among these, 1,2-octanediol is more preferable.

According to the preferable embodiment of the invention, the content of the sparingly water-soluble alkanediol is suitably determined to achieve a high quality image so long as it efficiently suppresses bleeding and beading of inks but is preferably 1.0 to 5.0% by mass, more preferably 1.5 to 4.0% by mass, even more preferably 2.0 to 3.5% by mass, relative to the entire composition. When the amount of the sparingly water-soluble alkanediol is within the aforementioned ranges, in particular, not below the lower limits, bleeding and beading of ink can be suppressed to achieve high quality images. Further, when the amount of the sparingly water-soluble alkanediol is within the aforementioned ranges, in particular, not beyond the upper limits, the initial viscosity of the inks does not increase excessively and separation of the oil layer can be effectively prevented in a general ink storage state, which is preferable from the viewpoint of ink storage property.

According to the preferable embodiment of the invention, a sparingly water-soluble alkanediol is 1,2-octanediol, and the content of sparingly water-soluble alkanediol is an ink composition which contains 1.5 to 3.0% by mass relative to the ink composition. When the amount of the sparingly water-soluble alkanediol is not below the lower limits, bleeding and beading of ink can be suppressed. Further, when the amount is not beyond the upper limits, the initial viscosity of the inks does not increase excessively.

Wetting Agent

The clear ink composition which is used in the inkjet recording method of the invention may preferably contain a wetting agent (hereinafter, referred to as "wetting agent") which is a solid even when left to stand in an environment at 20° C. and 60% relative humidity, that is to say, at 20° C. and 60% relative humidity. The wetting agent contains, for example, a saccharide. The saccharide will be described below.

Saccharide

The saccharide which can be preferably used in the clear ink composition used in the inkjet recording method of the invention is a sugar. It is preferable that the saccharide is a solid even when left to stand in an environment at 20° C./60% RH for 24 hours. Further, a hygroscopicity to 20° C./80% RH from 20° C./60% RH is preferably equal to or more than 0% by mass and less than 10% by mass. Further, the saccharide preferably has a solubility in 100 g of water at 20° C. of 30% by mass or more.

In the specification, for example "RH hygroscopicity to B° C./Y % from A° C./X % RH" is a value represented by the following formula:

(hygroscopicity(% by mass)))=100×$(M_{B-Y}-M_{A-X})/M_{A-X}$ $M_{A-X}$ represents a mass after being left to stand for 24 hours in an environment at A° C. and a relative humidity X%.
$M_{B-Y}$ represents a mass after being left to stand for 24 hours in an environment at B° C. and a relative humidity Y%.

The saccharide is not particularly limited so long as it has an effect of the invention, and one or more kinds selected from the group consisting of trehalose, isotrehalose, neotrehalose, and mannitol are preferable. Of these, trehalose is preferable. Further, it may be at least a trisaccharide which contains a saccharide selected from the group consisting of trehalose, isotrehalose, and neotrehalose, and for example includes maltosyl trehalose formed of trehalose and maltose.

Trehalose is a nonreducing disaccharide containing a glucoside bond between the 1-positions of glucose units. Since trehalose is a nonreducing sugar, browning caused by the Maillard reaction does not occur and trehalose is preferable from the viewpoint of storage stability of the ink. Moreover, trehalose has a high water solubility and a water retention ability and extremely low hygroscopicity. Specifically, highly pure trehalose anhydride has a remarkably high solubility in water (69 g/100 g (20° C.)), but has no hygroscopicity in a humidity of 95% or lower. Accordingly, when trehalose is in contact with water, it absorbs water to form a gel, but it has no hygroscopicity in an environment at 20° C. and humidity of about 45%, and therefore it can be stably present.

Further, isotrehalose and neotrehalose are nonreducing disaccharides containing glucoside bonds. Since they are nonreducing sugars, browning caused by the Maillard reaction does not occur and they are preferable from the viewpoint of storage stability of the ink.

Examples of commercially available saccharide include TREHA fine powder (manufactured by Hayashibara Shoji Inc.) as commercially available trehalose and D-mannitol (manufactured by Oji Chemical Industry Ltd.), and the like as commercially available mannitol.

Further, the saccharide can be prepared from starch sugar by specific methods such as fermentation, hydrolysis, a transglycosyl reaction, a glycosyl condensation reaction, reaction with epimerase (isomerization), polymerization, and chemical crosslinking. Solidification can be performed by a specific method, that is to say, a method where Maskit which is a solution containing saccharides is sprayed and dried, a method where moisture of Maskit is naturally dried to crystallize and solidify in a block shape, followed by grinding, and a method where recrystallization is performed using a seed crystal from Maskit in a dissolved condition. Further, Maskit may be present so long as a saccharide can be obtained as a saccharide for obtaining the aforementioned low hygroscopicity, and the saccharides may be contained in two or more kinds.

When a clear ink composition containing these saccharides is used in an inkjet recording method, in particular is used in printing at high speed, beading caused by flow unevenness can be suppressed. The reason is not clear, but it is thought to be as follows. The saccharide in the ink composition attached on a recording medium has a high solubility in water and a high water retention ability, and water in the ink composition after attachment can be incorporated and gelated (or solidified). It is thought that an ink droplet which is subject to gelation (or solidification) suppresses flowability (flow unevenness). Further, it is thought that the ink composition contains a lot of water soluble sugar according to van't Hoff's law, so that a permeation pressure and rate are increased. Irrespective of the aforementioned concept, beading is suppressed so that printing at high speed can be performed. Further, a color reproducible region of printing matter is increased because of an increase of a duty limiting value of ink attached on the recording medium.

Further, recording matter obtained using an ink composition containing these saccharides can improve resistance to dew formation in a high humidity environment at 20° C. and 60% relative humidity.

Further, an ink composition containing these saccharides can improve clogging recoverability in an environment in which a head is capped. The reason is not clear, but since the ink composition has low hygroscopicity, the ink composition in a cap does not remove moisture from the ink composition filled in a head, and therefore provides an excellent clogging recoverability in a cap-closed state.

An ink composition containing these saccharides prevents growth of ice crystals, and therefore storage stability of ink at low temperature is improved.

According to preferable embodiments of the invention, the first saccharide may be suitably determined so long as it has this effect, but it preferably contains equal to or more than 12 to equal to or less than 36% by mass relative to the whole ink composition. When the amount of the wetting agent is in within the aforementioned ranges, in particular, not below the lower limits, it is preferable because clogging recoverability is improved in the environment described above, and it is preferable from the viewpoint of gloss. Further, when the amount of the first saccharide is in within the aforementioned ranges, in particular, not beyond the upper limits, the initial viscosity of the inks does not increase excessively and a freezing temperature is reduced, and therefore it is preferable from the viewpoint of storage stability of ink at low temperature. Occurrence of curling, i.e., curling of a recording medium with its printed surface at the inner side, can be suppressed even when thin printing paper or PPC paper (plain paper) having a weight of 70 g/m² or less is used. The reason is not clear, but it is thought to be as follows. Cellulose is a long chain saccharide connecting (polymerizing) monosaccharides. Curling occurs by stopping hydrogen bonding between cellulose molecules due to water molecules and by generating hydrogen bonding between cellulose molecules in a different portion from the hydrogen bonding portion between cellulose molecules when water is evaporated and dried. Accordingly, in order to suppress curl, after water is evaporated and dried, a hydrogen bond between cellulose molecules may be inhibited as quickly as possible. It is thought that effective materials as these inhibitors are a crystalline saccharide having a molecular structure similar to cellulose, and more preferably trehalose, isotrehalose, and neotrehalose having excellent drying and recrystallization properties.

According to a further preferable embodiment of the invention, a ratio of the sparingly water-soluble alkanediol content to the wetting agent content is not particularly limited, but is preferably 12.0 to 42.0, and further preferably 27.0 to 39.0. By using this content ratio, clogging recoverability in open and closed systems is ensured, while beading and bleeding can be increased.

Amino Group-Containing Resin

The clear ink composition used in the inkjet recording method of the invention contains an amino group-containing resin.

In the clear ink composition used in the inkjet recording method of the invention, the amino group-containing resin has an alkaline aqueous solution, preferably a salt not being present with an amino group. By using the clear composition containing the amino group-containing resin, the reason why a high-quality image free of bleeding or beading can be formed is not clear, but it is thought to be as follows. There is a case where an aqueous solution of an amino group-containing resin in which an amino group forms a salt with acids such as hydrochloric acid or sulfonic acid may show an acidity depending on kinds of acid therein. When such an amino group-containing resin contacts an ink composition which disperses a colorant by becoming alkaline, an aggregation reaction is radically promoted, and therefore separation of colorant results in solidification.

When the cohesion reaction causes solidification in a pathway of waste solution (ink absorber, waste solution flow channel and waste solution tank), the pathway is clogged and therefore it is preferable from the viewpoint of treatment of a waste solution. Further, when the cohesion reaction occurs in the recording medium, solidified cohesion matter inhibits permeation of water to a wetting agent, which is not preferable from the viewpoint of beading.

When the amino group-containing resin is alkali, since the cohesion reaction is promoted, it does not inhibit permeation of water to a wetting agent, which is preferable from the viewpoint of beading. Further, a colorant-containing alkaline ink is cohered so as to inhibit a fluidity thereof, which is preferable from the viewpoint of treatment of a waste solution.

The amino group-containing resin can use an amino group-containing resin described in Japanese Patent No. 4144487, Japanese Patent No. 4240375, Japanese Patent No. 4281393, and Japanese Patent No. 4239152. In particular, the modified polyallylamine described in Japanese Patent No. 4144487 is preferable from the viewpoint of a small dot diameter on a recording medium and excellent treating properties of a waste solution. A more preferable embodiment with the amino group-containing resin may be a carbamoyl-modified polyallylamine described in Japanese Patent Nos. 4240375 and 4281393. For example, the amino group-containing resin may include a copolymer (copolymerization ratio 5:5) of free type N,N-diallylmethylamine and carbamoylated allylamine. Hereinafter, modified polyallylamine will be described later.

Modified Polyallylamine

In the description of the modified polyallylamine of the specification, an alkyl group as a group or a part thereof may be a straight chain or a branched chain.

The amino group-containing resin which is contained in the clear ink composition which is used in the inkjet recording method of the invention is preferably modified polyallylamine. The modified polyallylamine is a copolymer, as a starting material, (hereinafter, referred to as a copolymer of starting materials) which contains a diallylalkylamine monomer unit represented by the following repeating unit (a) and an allylamine monomer unit represented by the repeating unit (c) as essential components; and a dialkylallylamine monomer unit represented by the following repeating unit (b) as an optional component, which is modified with various substituents represented by the following formula.

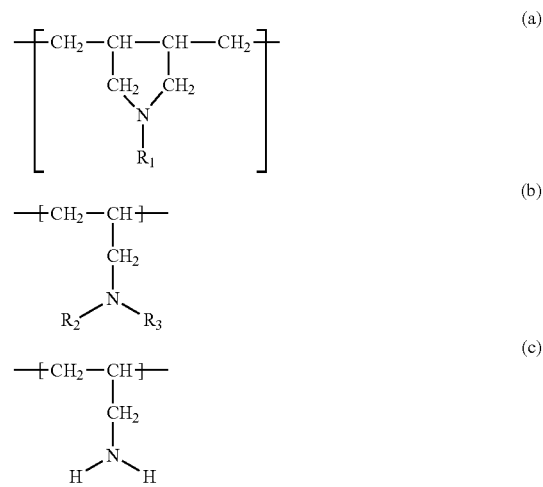

$R_1$, $R_2$, and $R_3$ each independently represent an alkyl group having 1 to 4 carbon atoms, preferably a methyl group.

The modified polyallylamine which is used in the invention has one or two hydrogen atoms of —$NH_2$ of (c) allylamine repeating unit which are replaced with any of the following (i) to (v).

In other word, the modified polyallylamine includes (i) —$CONH_2$ (hereinafter, referred to as urea-modified polyallylamine), (ii) —$COOR_2$ (hereinafter, referred to as urea-modified polyallylamine), (iii) —$COR_3$ (hereinafter, referred to as acyl-modified polyallylamine), (iv) —$CH_2CH(R_4)$—A (hereinafter, referred to as Michael-modified polyallylamine), and (v) —$CH_2CH(OH)$—B (hereinafter, referred to as alcohol-modified polyallylamine).

The modified polyallylamine of the invention will be described.

i. Urea-Modified Polyallylamine

The urea-modified polyallylamine is a copolymer of the following repeating units (a), (b), (c) and (d1).

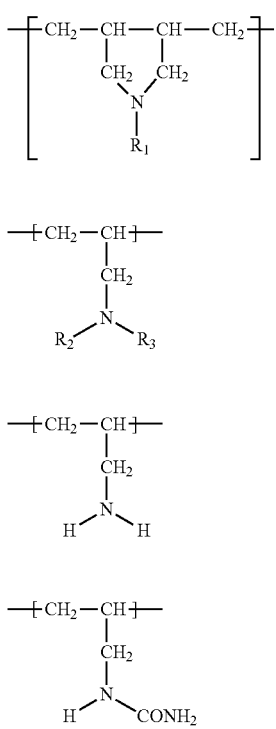

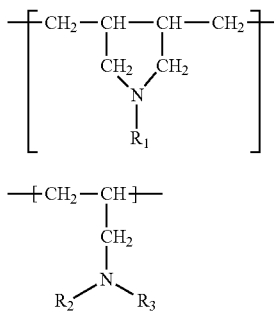

$R_1$, $R_2$, and $R_3$ each independently represent an alkyl group having 1 to 4 carbon atoms, preferably a methyl group.

Further, a ratio of the number of repeating units (a) is preferably 0 to 90%, more preferably 0 to 80%, with respect to the total number of constituent monomer units of (a) and (b) which constitutes modified polyallylamine. Further, a ratio of the number of repeating units (a) and (b) is preferably 5 to 95%, more preferably 10 to 90%, even more preferably 20 to 80%, with respect to the total number of monomer components which constitutes modified polyallylamine. At this time, carbamoylation, that is to say, a ratio of the number of (d1) with respect to the total number of components of repeating units (c) and (d1) is preferably 60 to 100%, more preferably 90 to 100%, and even more preferably 95 to 100%, from the viewpoint of solubility and stability of modified polyallylamine.

ii. Urethane-Modified Polyallylamine

The urethane-modified polyallylamine is a copolymer of the following repeating units (a), (b), (c) and (d2).

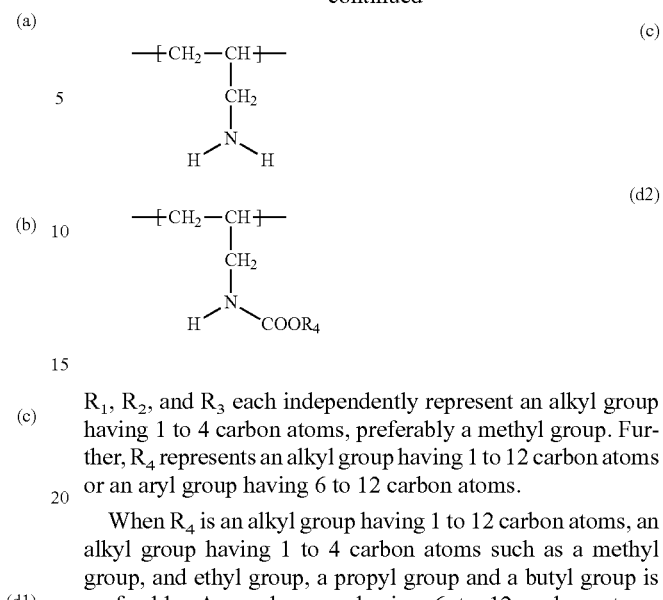

$R_1$, $R_2$, and $R_3$ each independently represent an alkyl group having 1 to 4 carbon atoms, preferably a methyl group. Further, $R_4$ represents an alkyl group having 1 to 12 carbon atoms or an aryl group having 6 to 12 carbon atoms.

When $R_4$ is an alkyl group having 1 to 12 carbon atoms, an alkyl group having 1 to 4 carbon atoms such as a methyl group, and ethyl group, a propyl group and a butyl group is preferable. An aryl group having 6 to 12 carbon atoms includes a phenyl group, an o-tolyl group, an m-tolyl group and a p-tolyl group.

Further, a ratio of the number of repeating units (a) is preferably 0 to 90%, more preferably 0 to 80%, with respect to the total number of constituent monomer units of (a) and (b) which constitutes modified polyallylamine. Further, a ratio of the number of repeating units (a) and (b) is preferably 5 to 95%, more preferably 10 to 90%, even more preferably 20 to 80%, with respect to the total number of monomer components which constitutes modified polyallylamine. At this time, alkoxycarbamoylation (or aryloxycarbonylation), that is to say, a ratio of the number of (d2) with respect to the total number of repeating units (c) and (d2) is preferably 60 to 100%, more preferably 90 to 100%, and even more preferably 95 to 100%, from the viewpoint of solubility and stability of modified polyallylamine.

iii. Acyl-Modified Polyallylamine

The acyl-modified polyallylamine is a copolymer of the following repeating units (a), (b), (c) and (d3).

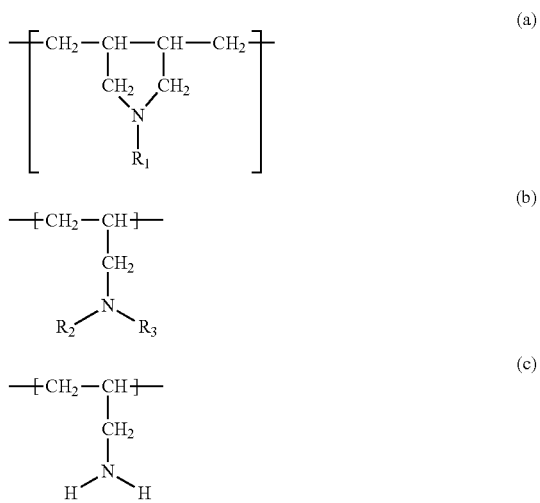

-continued

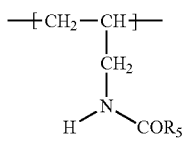
(d3)

$R_1$, $R_2$, and $R_3$ each independently represent an alkyl group having 1 to 4 carbon atoms, preferably a methyl group. Further, $R_5$ represents an alkyl group having 1 to 12 carbon atoms, preferably a methyl group, an ethyl group, an n-propyl group, an i-propyl group, an n-butyl group, an n-pentyl group, an n-hexyl group, an n-heptyl group, and an n-nonyl group.

Further, a ratio of the number of repeating units (a) is preferably 0 to 90%, more preferably 0 to 80%, with respect to the total number of constituent monomer units of (a) and (b) which constitutes modified polyallylamine. Further, a ratio of the number of repeating units (a) and (b) is preferably 5 to 95%, more preferably 10 to 90%, even more preferably 20 to 80%, with respect to the total number of monomer components which constitutes modified polyallylamine. At this time, acylation, that is to say, a ratio of the number of (d3) with respect to the total number of repeating units (c) and (d3) is preferably 60 to 100%, more preferably 90 to 100%, and even more preferably 95 to 100%, from the viewpoint of solubility and stability of modified polyallylamine.

iv. Michael-Modified Polyallylamine

The Michael-modified polyallylamine is a copolymer of the following repeating units (a), (b), (c), (d41) and/or (d42).

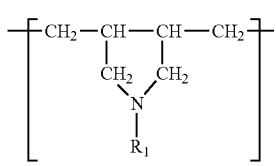
(a)

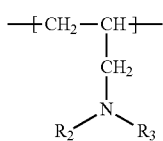
(b)

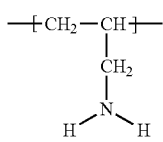
(c)

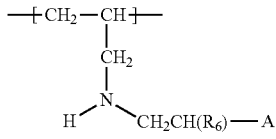
(d41)

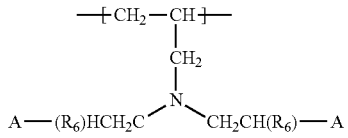
(d42)

$R_1$, $R_2$, and $R_3$ each independently represent an alkyl group having 1 to 4 carbon atoms, preferably a methyl group. Further, $R_6$ represents a hydrogen atom, or a methyl group. A represents $-CONR_7R_8$ ($R_7$ and $R_8$ each independently represent a hydrogen atom, or an alkyl group having 1 to 8 carbon atoms (an alkyl group may be replaced by a group selected from the group consisting of a hydroxy group, keto group, alkylamino group having 1 to 4 carbon atoms, di(alkyl having 1 to 4 carbon atoms)amino group, or tri(alkyl having 1 to 4 carbon atoms)ammonium group), $-CN$, and $COOR_9$ ($R_9$ is selected from a group consisting of an alkyl group having 1 to 8 carbon atoms (the alkyl group may be replaced with a group selected from a group consisting of a hydroxy group, a keto group, an alkylamino group having 1 to 4 carbon atoms, a di(alkyl having 1 to 4 carbon atoms)amino group, and a tri(alkyl having 1 to 4 carbon atoms)ammonium group).

Group $-CH_2CH_2(R_6)-A$ is a Michael reaction addition product of an acryl compound. However, when the group is an acryl amide additive type (A is $-CONR_5R_6$ type), it includes, $-CH_2CH_2CONH_2$, $-CH_2CH_2CONHCH_3$, $-CH_2CH_2CON(CH_3)_2/-CH_2CH_2CONHC_2H_5$, $-CH_2CH_2CON(C_2H_5)_2$, $-CH_2CH_2CONH-nC_3H_7$, $-CH_2CH_2CON(nC_3H_7)_2$, $-CH_2CH_2CONH-iC_3H_7$, $-CH_2CH_2CONHCH_2O-nC_4H_9$, $-CH_2CH_2CONHCH_2OH$, $-CH_2CH_2CONHCH_2CH_2N(CH_3)_2$, $-CH_2CH_2CONHCH_2CH_2N(C_2H_5)_2$, $-CH_2CH_2CONHCH_2CH_2N(CH_3)_2$, $-CH_2CH_2CONHCH_2CH_2CH_2N(C_2H_5)_2$, $-CH_2CH_2CONHCH_2CH_2N^+(CH_3)_3$, $-CH_2CH_2CONHCH_2CH_2N^+(C_2H_5)_3$, $-CH_2CH_2CONHCH_2CH_2CH_2N^+(CH_3)_3$, $-CH_2CH_2CONHCH_2CH_2CH_2N^+(C_2H_5)_3$, $-CH_2CH_2CO$-morpholino group, $-CH_2CH_2CO$-piperidino group, $-CH_2CH(CH_3)CONH_2$, $-CH_2CH(CH_3)CONHCH_3$, $-CH_2CH(CH_3)CON(CH_3)_2$, $-CH_2CH(CH_3)CONHC_2H_5$, $-CH_2CH(CH_3)CON(C_2H_5)_2$, $-CH_2CH(CH_3)CONH-nC_3H_7$, $-CH_2CH(CH_3)CON(nC_3H_7)_2$, $-CH_2CH(CH_3)CONH-iC_3H_7$, $-CH_2CH(CH_3)CONHCH_2O-nC_4H_9$, $-CH_2CH(CH_3)CONHCH_2OH$, $-CH_2CH(CH_3)CONHCH_2CH_2N(CH_3)_2$, $-CH_2CH(CH_3)CONHCH_2CH(CH_3)N(C_2H_5)_2$, $-CH_2CH(CH_3)CONHCH_2CH_2CH_2N(CH_3)_2$, $-CH_2CH(CH_3)CONHCH_2CH_2CH_2N(C_2H_5)_2$, $-CH_2CH(CH_3)CONHCH_2CH_2N^+(CH_3)_3$, $-CH_2CH(CH_3)CONHCH_2CH_2N^+(C_2H_5)_3$, $-CH_2CH(CH_3)CONHCH_2CH_2CH_2N^+(CH_3)_3$, $-CH_2CH(CH_3)CONHCH_2CH_2CH_2N^+(C_2H_5)_3$, $-CH_2CH(CH_3)CO$-morpholino group, $-CH_2CH(CH_3)CO$-piperidino group.

When group $-CH_2CH_2(R_4)-A$ is an acrylonitrile additive type, it includes $-CH_2CH_2CN$, and $-CH_2CH(CH_3)CN$.

Further, when group-$CH_2CH_2(R_4)-A$ is an acrylic ester additive type, it includes, $-CH_2CH_2COOCH_3$, $-CH_2CH_2COOC_2H_5$, $-CH_2CH_2COOC_3H_7$, $CH_2CH_2COOC_4H_9$, $CH_2CH_2COOCH_2CH_2N(CH_3)_2$, $CH_2CH_2COOCH_2CH_2CH_2N(CH_3)_2$, $-CH_2CH_2COOCH_2CH_2N(C_2H_5)_2$, $-CH_2CH_2COOCH_2CH_2CH_2N(C_2H_5)_2$, $-CH_2CH_2COOCH_2CH_2CH_2N^+(CH_3)_3$, $-CH_2CH_2COOCH_2CH_2N^+(C_2H_5)_3$, $-CH_2CH_2COOCH_2CH_2CH_2N^+(C_2H_5)_3$.

A ratio of the number of repeating units (a) is preferably 0 to 90%, more preferably 0 to 80%, with respect to the total number of constituent monomer units of (a) and (b) which constitutes modified polyallylamine. Further, a ratio of the repeating units (a) and (b) is preferably 5 to 95%, more preferably 10 to 90%, even more preferably 20 to 80%, with respect to the total number of monomer components which constitutes modified polyallylamine. At this time, Michael additive type replacing degree, that is to say, a ratio of the number of (d41) and/or (d42) with respect to the total number of repeating units (c) and (d41) and/or (d42) is preferably 60 to 100%, more preferably 90 to 100%, and even more preferably 95 to 100%, from the viewpoint of solubility and stability of modified polyallylamine.

A ratio of the number of (d42) with respect to the total number of repeating units (d41) and (d42) is preferably 60 to 100%, more preferably 90 to 100%, and even more preferably 95 to 100%, from the viewpoint of treatment of waste solution.

v. Alcohol-Modified Polyallylamine

The alcohol-modified polyallylamine is a copolymer of the following repeating units (a), (b), (c), (d51), and/or (d52).

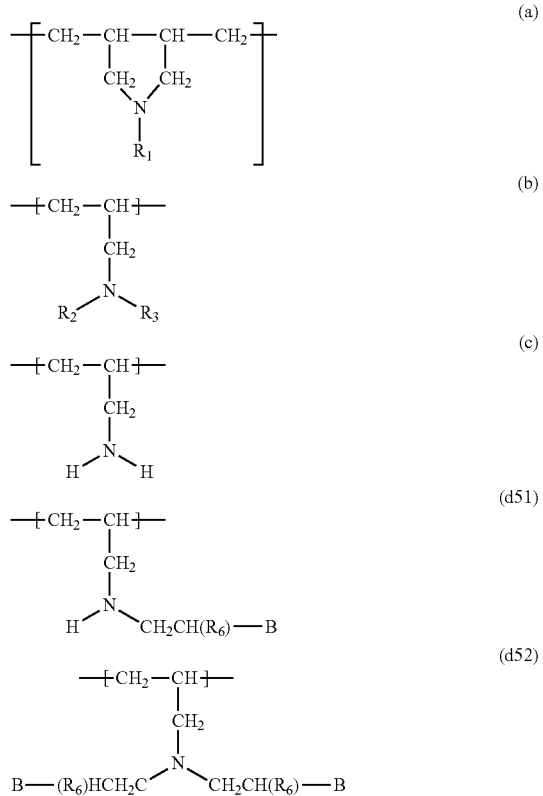

$R_1$, $R_2$, and $R_3$ each independently represent an alkyl group having 1 to 4 carbon atoms, preferably a methyl group. Further, B represents an alkyl group having 1 to 8 carbon atoms (the alkyl group may be replaced with a group selected from a group consisting of a hydroxy group, an alkoxy group having 1 to 4 carbon atoms, and an alkenyloxy group).

B is a hydroxy group, an alkyloxy group having 1 to 4 carbon atoms or an alkyl group having 1 to 8 carbon atoms (the alkyl group may be replaced with an alkenyloxy group), specifically includes a methyl group, an ethyl group, a propyl group, a butyl group, a pentyl group, a hexyl group, a methoxymethyl, an ethoxymethyl group, a propoxymethyl group, a butoxymethyl group, a pentoxymethyl group, a hydroxymethyl group, and a (2-propenyloxy)methyl group.

Group —$CH_2CH_2(R_6)$—B includes 2-hydroxypropyl group, 2-hydroxybutyl group, 2-hydroxypentyl group, 2-hydroxyhexyl group, 2-hydroxyheptyl group, 2-hydroxyoctyl group, 3-methoxy-2-hydroxypropyl group, 3-ethoxy-2-hydroxypropyl group, 3-propoxy-2-hydroxypropyl group, 3-(i-propoxy)-2-hydroxypropyl group, 3-butoxy-2-hydroxypropyl group, 3-pentoxy-2-hydroxypropyl group, 2,3-dihydroxypropyl group, 3-(2-propenyl)-2-hydroxypropyl group.

A ratio of the number of repeating units (a) is preferably 0 to 90%, more preferably 0 to 80%, with respect to the total number of constituent monomer units of (a) and (b) which constitutes modified polyallylamine. Further, a ratio of the number of repeating units (a) and (b) is preferably 5 to 95%, more preferably 10 to 90%, even more preferably 20 to 80%, with respect to the total number of monomer components which constitutes modified polyallylamine. At this time, a hydroxyalkyl replacing degree, that is to say, a ratio of the number of (d51) and/or (d52) with respect to the total number of repeating units (c) and (d51) and/or (d52) is preferably 60 to 100%, more preferably 90 to 100%, and even more preferably 95 to 100%, from the viewpoint of solubility and stability of modified polyallylamine.

A ratio of the number of (d52) with respect to the total number of repeating units (d51) and/or (d52) is preferably 60 to 100%, more preferably 90 to 100%, even more preferably 95 to 100%, from the viewpoint of treatment of waste solution.

The modified polyallylamine configuration will be described. When a plurality of allylamine modified monomer units are present, all monomer units may be the same as or different to each other, and may be formed of a plurality of different monomer units.

The weight average molecular weight of the modified polyallylamine is preferably 12,000 or less, more preferably equal to or more than 200 and equal to or less than 12,000, even more preferably equal to or more than 200 and equal to or less than 8,000, and most preferably equal to or more than 1000 and equal to or less than 5000. When the molecular weight is 12,000 or less, a suitable solubility of modified polyallylamine with respect to components which are contained in the clear ink composition used in the recording method of the invention can be obtained. When the molecular weight is 200 or more, in the inkjet recording method, performance of recording matter can be improved. "Weight average molecular weight" of the specification was measured by Gel Permeation chromatography (GPC) in terms of polyethylene glycol.

A copolymer of the starting materials, for example, can be composed by the following methods.

The copolymer of the starting materials essentially contains diallylalkylamine and monoallylamine as a monomer, if desirable, an aqueous solution containing dialkylallylamine can be produced by polymerization in the presence of a polymerization initiator. In this case, a concentration of the monomer in the aqueous solution is 10 to 80% by mass, preferably 15 to 70% by mass. As a diallylalkylamine, methyldiallylamine is preferably used since modification has high solubility. Any dialkylallylamine is preferably 0 to 90%, more preferably 0 to 80%, with respect to diallylalkylamine monomer.

Examples of the polymerization initiator which are preferably used include a compound having an aqueous azo group such as 2,2'-azobis(2-amidinopropane)dihydrochloride. The polymerization initiator is preferably 0.1 to 30% by mole with respect to the total amount of monomer. A polymerization time is 3 to 100 hours, preferably 5 to 7 hours.

The weight average molecular weight of copolymer of the starting materials is preferably 200 to 12,000, more preferably 200 to 8000 and even more preferably 300 to 5000. When a molecular weight is within the aforementioned range, the resultant modified polyallylamine is satisfactorily dissolved in a solvent forming an ink, and an attaching property to parts used in an inkjet recording apparatus is suppressed, to allow entry to parts of an ink flow channel.

As the modified polyallylamine containing the clear ink composition, a copolymer of starting materials is reacted with reagents where an amino group is replaced with substituents having 1 to 12 carbon atoms, for example, an N-carbamoylation reagent, alkoxycarbonylation reagent, aryloxycarbonylation reagent, an acylation reagent or an acryl compound capable of Michael addition reaction or a 1,2-epoxyalkane compound which may have a substituent, and partial proportion or all of hydrogen atoms in —NH$_2$ of an allylamine monomer in the copolymer as starting materials may be modified by a "—NH-substituent" or/and a "—N-disubstituent" to obtain a copolymer of N,N-dialkylallylamine and N-substituted allylamine.

The content of the amino group-containing resin of the invention is suitably determined from the viewpoint of a reduction effect on dot size of recording matter and waste liquid treatment, but according to the preferable embodiment, it is preferably 2.0 to 8.0% by mass in terms of the solid content of the ink composition.

In the invention, polyethyleneimine or a derivative thereof may be mixed and added.

(Poly)Oxyalkylene Glycol

The clear ink composition used in the inkjet recording method of the invention may contain (poly)oxyalkylene glycol.

When (poly)oxyalkylene glycol is contained in the clear ink composition used in the inkjet recording method of the invention, (poly)oxyalkylene glycol is preferably a water-miscible oligomer obtained by addition polymerization of ethylene oxide and/or propylene oxide. According to the preferable embodiment of the invention, more preferably (poly)oxyalkylene glycol is one or two or more kinds selected from a group consisting of ethylene glycol, diethylene glycol, triethylene glycol, propylene glycol, dipropylene glycol, and tripropylene glycol, even more preferably one or two or more kinds selected from a group consisting of triethylene glycol, propylene glycol, dipropylene glycol, and tripropylene glycol. According to the preferable embodiment of the invention, the (poly)oxyalkylene glycol is more preferably water miscible (poly)propylene glycol. The (poly)propylene glycol is not specifically limited, it is more preferably, tripropylene glycol (CAS No. 24800-44-0) from the viewpoint of low moisture absorbency.

The (poly)oxyalkylene glycol of the invention is suitability determined as long as bleeding or beading of ink can be efficiently suppressed it is 2.0 to 18.0% by mass, more preferably 6.0 to 18.0% by mass, with respect to the whole ink composition. When the amount of (poly)oxyalkylene glycol is within the aforementioned range, in particular, not below the lower limits, sparingly water soluble alkanediol can be maintained in a mixed state without separation during drying of ink droplets. When the amount of (poly)oxyalkylene glycol is within the aforementioned range, in particular, not beyond the upper limits, an initial viscosity of ink is not excessively increased, and separation of the oil layer can be effectively prevented in a general ink storage state, which is preferable from the viewpoint of an ink storage property. It is preferable from the viewpoint of gloss because of prevention of an incompatible state.

Since (poly)oxyalkylene glycol is hardly dried in a high temperature, low humidity environment, there are advantages where clogging recoverability of nozzles can be improved in an open environment at 50° C. and 15% RH.

The sum of the content of the (poly)oxyalkylene glycol and wetting agent is equal to or more than 12.0% by mass and equal to or less than 60.0% by mass, more preferably equal to or more than 30.0% by mass and equal to or less than 54.0% by mass, with respect to the ink composition. By using this range, it has excellent curl suppression in a case of use of various recording media, in particular, a non- or low absorbable recording medium.

A ratio of the sum of the content of the (poly)oxyalkylene glycol and the wetting agent to the sparingly water soluble alkanediol is preferably 1:5 to 1:20. By using this range, the sparingly water soluble alkanediol can be stably dissolved, and it has excellent curl suppression even in a case of use of various recording media, in particular, a non- or low absorbable recording medium.

Water-Soluble Alkanediol

According to the preferable embodiment of the invention, the clear ink composition used in the inkjet recording method of the invention may contain water soluble alkanediol in addition to an amino group-containing resin, a sparingly water soluble alkanediol, and a wetting agent. Thereby, it is advantageous from the viewpoint that bleeding of materials other than solid content of the ink composition, that is to say, aqueous solution containing solvent can be suppressed.

The water soluble alkanediol which is contained in the clear ink composition used in the inkjet recording method of the invention is an alkanediol at both ends or at one end. The water soluble alkanediol is preferably an alkanediol having 3 or more carbon atoms, more preferably an alkanediol having 3 to 6 carbon atoms. The water soluble alkanediol which is contained in the clear ink composition used in the inkjet recording method of the invention is preferably a water soluble hexanediol such as 1,2-hexanediol or 1,6-hexanediol, 2-methyl-1,3-propanediol, or 3-methyl-1,5-pentanediol. Of these, 1,2-hexanediol or 3-methyl-1,5-pentanediol is preferable. From the viewpoint of excellent ejecting stability of at high frequency, 1,6-hexanediol is preferable. An alkanediol at both ends means an alkanediol having a hydroxyl group at both ends in the main chain of an alkyl chain. Alkanediol at one end means an alkanediol having a hydroxyl group at one end in the main chain of an alkyl chain. Therefore, for example, 1,6-hexanediol and 3-methyl-1,5-pentanediol are alkanediols at both ends, 1,2-hexanediol is an alkanediol at one end.

Further, according to the preferable embodiment of the invention, a content ratio of the sparingly water soluble alkanediol to the water soluble alkanediol is preferably 3:1 to 1:2. When the ratio is within the range, beading when internal coloration time is short can be inhibited.

Further, according to the preferable embodiment of the invention, the total content of the water soluble alkanediol and the wetting agent is preferably 40.0% by mass or less, more preferably 28.0% by mass or less, with respect to the ink composition. By using the amount within the range, beading when coloration time interval is short can be inhibited.

Further, according to the preferable embodiment of the invention, the total content of the water soluble alkanediol and the (poly)oxyalkylene glycol is preferably 22.0% or less, more preferably 16.0% by or less, even more preferably 10.0% by less, with respect to the ink composition. By using the amount within this range, when coloration time interval is short, bleeding can be inhibited.

The total content of (poly)oxyalkylene glycol, water soluble alkanediol, and sparingly water soluble alkanediol is preferably 26.0% by mass or less, more preferably 20.0% by mass or less, even more preferably 14.0% by mass or less, with respect to the ink composition. By using the amount within this range, when coloration time interval is short, bleeding can be inhibited.

The total content of wetting agent, water soluble alkanediol, and sparingly water soluble alkanediol is preferably equal to or more than 16.0% by mass and equal to or less than 40.0% by less, more preferably equal to or more than 16.0% by mass and equal to or less than 28.0% by less, with respect to the ink composition. By using the amount within this range, when coloration time interval is short, beading can be inhibited.

According to the preferable embodiment of the invention, the content of water-soluble alkanediol is suitably determined to achieve a high quality image so long as it efficiently suppresses bleeding and beading of inks but is preferably 1.0 to 5.0% by mass, more preferably 0.1 to 3.0% by mass, even more preferably 0.3 to 1.0% by mass, relative to the entire composition. When the amount of the sparingly water-soluble alkanediol is within the aforementioned ranges, in particular, not below the lower limits, bleeding of ink can be suppressed to achieve high quality images. Further, when the amount of the water-soluble alkanediol is within the aforementioned ranges, in particular, not beyond the upper limits, the initial viscosity of the inks does not increase excessively and separation of the oil layer can be effectively prevented in a general ink storage state, which is preferable from the viewpoint of ink storage property.

When 1,2-hexanediol which is a preferable embodiment of the water soluble alkanediol is contained in an amount of 0.3 to 1.0% by mass with respect to the entire composition, a high quality image which does not have bleeding or beading can be obtained, or it is effective as a regulator having different ejecting performances depending on pigment kinds or resin amount.

According to the preferable embodiment of the invention, the content of (poly)oxyalkylene glycol is equal to or more than 6% by mass or equal to or less than 18% by mass, with respect to ink composition, the content of wetting agent is equal to or more than 12% by mass and equal to or less than 36% by mass, the content of water is equal to or more than 30% by mass and equal to or less than 74% by mass, and a ratio of the total content of (poly)oxyalkylene glycol and the wetting agent, to the content of water is 5:3 to 1:4. By using the amount within this range, precipitation of the wetting agent in the ink composition can be inhibited, or saccharides can be rapidly precipitated in the recording medium, which is preferable.

According to the preferable embodiment of the invention, with respect to ink composition, the content of sparingly water soluble alkanediol is equal to more than 1.0% by mass and equal to less than 5.0% by mass, the content of water soluble alkanediol is equal to or more than 0.1% by mass and equal to or less than 5.0% by mass, and the content ratio of sparingly water soluble alkanediol and the water soluble alkanediol is preferably 3:1 to 1:2. By using the amount within this range, when coloration time interval is short, beading can be suppressed.

Other Solvents

According to the preferable embodiment of the invention, the clear ink composition used in the inkjet recording method of the invention may further contain triethylene glycol monomethyl ether. By adding 6 to 18% by mass of triethyl glycol monomethyl ether, clogging in an ink cap for capping an inkjet head can be suppressed. The clogging in an ink means that waste liquid retained in the cap is dried and solidified so that micropores of an ink absorbent such as non-woven fabric in an ink cap are clogged. By suppressing clogging in an ink cap, reduction of a cleaning success rate can be prevented, and nozzle clogging recoverability can be improved.

Surfactant

The clear ink composition which is used in the inkjet recording method of the invention may contain a surfactant. With respect to plain paper as a recording medium, since the surfactant is used on the surface where an ink-receiving fiber layer is present, and thereby bleeding can be adjusted, an image having excellent fine lines can be obtained. Especially, even when a recording medium whose reception layer on the surface has a coated layer for receiving oil-based ink, such as printing paper, is used, bleed (bleeding) of colors can be prevented, and also whitening caused by reflected light, which occurs with an increase in the adhesion amount of ink, can be prevented.

The surfactant used in the invention is preferably a polyorganosiloxane-based surfactant, which can increase the permeability of ink by increasing wettability to a recording medium surface when a recording image is formed.

When the polyorganosiloxane-based surfactant is used, since one kind of the sparingly water-soluble alkanediol and one kinds of (poly)oxyalkylene glycol are contained described above, the solubility of the surfactant into the ink is increased to prevent occurrence of insoluble matter or the like, and thereby an ink composition excellent in discharge stability can be provided.

As the surfactant described above, those that are commercially available may be used. For example, BYK-347 (manufactured by BYK-Chemie), and BYK-348 (manufactured by BYK-Chemie) can be used.

As the surfactants used in the invention, the polyorganosiloxane surfactant is not particularly limited but preferably has a dynamic surface tension of 26 mN/m or less at 1 Hz when prepared in an aqueous solution containing 20% by mass of glycerin, 10% by mass of 1,2-hexanediol, 0.1% by mass polyorganosiloxane surfactant, and 69.9% by mass water. The dynamic surface tension can be measured with, for example, a bubble pressure tensiometer BP2 (manufactured by KRUSS GmbH).

As the surfactant described above, those that are commercially available may be used. For example, OLFINE PD-501 (manufactured by Nissin Chemical Industry Co., Ltd.), and OLFINE PD-570 (manufactured by Nissin Chemical Industry Co., Ltd.) can be used.

Furthermore, the polyorganosiloxane-based surfactant more preferably contains one or more compounds represented by the following Formula (I):

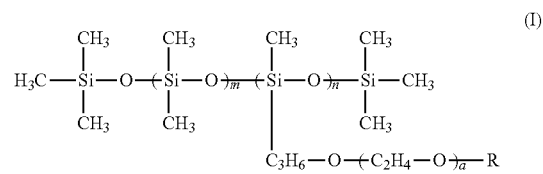

(in the Formula (I), R represents a hydrogen atom or a methyl group, a represents an integer of 2 to 13, m represents an integer of 2 to 70, and n represents an integer of 1 to 8) or contains one or more compounds represented by the above Formula (I) wherein R represents a hydrogen atom or a methyl group, a represents an integer of 2 to 11, m represents an integer of 2 to 50, and n represents an integer of 1 to 5. Furthermore, the polyorganosiloxane-based surfactant more preferably contains one or more compounds represented by the above Formula (I) wherein R represents a hydrogen atom or a methyl group, a represents an integer of 2 to 13, m represents an integer of 2 to 50, and n represents an integer of 1 to 5. Furthermore, the polyorganosiloxane-based surfactant more preferably contains one or more compounds represented by the above Formula (I) wherein R represents a hydrogen atom or a methyl group, a represents an integer of 2 to 13, m represents an integer of 2 to 50, and n represents an integer of 1 to 8. Alternatively, the polyorganosiloxane-based surfactant more preferably contains one or more compounds represented by the above Formula (I) wherein R represents a methyl group, a represents an integer of 6 to 18, m represents an integer of 0 to 4, and n represents an integer of 1 to 2 or a compound wherein R represents a methyl group, a represents an integer of 6 to 18, m represents an integer of 0, and n represents an integer of 1. The use of such specific polyorganosiloxane-based surfactants further improves uneven aggregation of ink even in the case of printing on printing paper as a recording medium.

In the compound in formula (I), a compound where R is a methyl group is used, and further beading of the ink can be improved. Further, in compound of formula (I), a compound where R is a hydrogen atom is used in combination, and further bleeding of ink can be improved.

In the compound in formula (I), when a ratio of a compound where R is a methyl group and a compound where R is a hydrogen atom is suitably adjusted, a high-quality image which does not have bleeding or beading can be obtained, and it is effect as a regulator of a compound having different fluidity due to pigments or resin kinds.

The amount of the surfactant contained in the clear ink composition which is used in the inkjet recording method of the invention is preferably 0.01 to 1.0% by mass and more preferably 0.05 to 0.50% by mass. In particular, from the viewpoint of beading, the content of the surfactant when a surfactant with R being a methyl group is used is preferably higher than that when a surfactant with R being a hydrogen atom is used. A surfactant with R being a hydrogen atom is contained at an amount of 0.01 to 0.1% by mass, thereby expressing repellency and controlling bleeding.

To the clear ink composition which is used in the inkjet recording method of the invention may be added other surfactants, specifically acetylene glycol surfactants, anion surfactants, nonionic surfactants, and amphoteric surfactants.

Among them, examples of the acetylene glycol-based surfactant include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol. In addition, the acetylene glycol-based surfactant may be those that are commercially available, and examples thereof include Olfin E1010, STG, and Y (trade names, manufactured by Nissin Chemical Industry Co., Ltd.), Surfynol 61, 104, 82, 465, 485, and TG (trade names, manufactured by Air Products and Chemicals Inc.).

Water and Other Components

The clear ink composition which is used in the inkjet recording method of the present invention contains water. Water preferably is pure water such as ion exchange water, ultrafiltration water, reverse osmosis water, distillation water or the like, or ultrapure water. These waters, which have been sterilized, for example, by ultraviolet irradiation or by addition of hydrogen peroxide, are particularly preferred because they can prevent the growth of mold or bacteria in the ink composition for a long period of time.

Further, the clear ink composition which is used in the inkjet recording method of the present invention preferably includes a penetrating agent in addition to the above components.

The penetrating agent can suitably use glycol ethers.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used independently or as a mixture of two or more kinds.

Among the above glycol ethers, alkyl ethers of polyhydric alcohols are preferred. Particularly preferred are ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol monobutyl ether, triethylene glycol monoethyl ether, or triethylene glycol mono-n-butyl ether.

More preferred are triethylene glycol monomethyl ether and triethylene glycol mono-n-butyl ether.

The addition amount of the penetrating agent may be properly determined but is preferably about 0.1 to 30% by mass, more preferably about 1 to 20% by weight.

Preferably, the clear ink composition which is used in the inkjet recording method of the present invention further includes a solubilizer for a recording medium in addition to the above components.

Pyrrolidones such as N-methyl-2-pyrrolidone, pyrrolidone carboxylic acid and alkali metal salts of these can be suitably used as a solubilizer for a recording medium. Further, glymes such as diethylene glycol diethyl ether, dipropyl glycol dimethyl ether, dipropylene glycoldiethyl ether, or lactams such as γ-butyrolactam can be preferably used. The addition amount of the solubilizer for a recording medium may be properly determined but is preferably about 0.1 to 30% by mass, more preferably about 1 to 20% by mass.

The clear ink composition which is used in the inkjet recording method of the invention preferably contains a wetting agent such as glycerin and its derivatives, for example, 3-(2-hydroxyethoxy)-1,2-propanediol (CAS 14641-24-8) or 3-(2-hydroxypropoxy)-1,2-propanediol. Glycerin and its derivatives are preferred from the viewpoint of increase in the clogging recoverability, since they have a function of preventing drying and solidification of inks in ink jet nozzles. In the invention, 0.1 to 8% by mass of wetting agents can be contained.

Nozzle clogging preventives, preservatives, antioxidants, electric conductivity adjustors, pH adjustors, viscosity modifiers, surface tension modifiers, and oxygen absorbers, may be further added to the clear ink composition which is used in the inkjet recording method of the present invention.

For example, sodium benzoate, sodium pentachlorophenol, sodium 2-pyridinethiol-1-oxide, sodium sorbate, sodium dehydroacetate, and 1,2-dibenzothiazolin-3-one (Proxel CRL, Proxel BND, Proxel GXL, Proxel XL-2, and Proxel TN, manufactured by ICI) may be used as preservatives and antimold agents.

Examples of pH adjustors, dissolution aids, or antioxidants usable herein include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; other phosphates; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The ink composition according to the present invention may contain an additional antioxidant and an ultraviolet absorber, and examples thereof include: products of Ciba Specialty Chemicals, K.K., for example, Tinuvin 328, 900, 1130, 384, 292, 123, 144, 622, 770, 292, Irgacor 252 153, Irganox 1010, 1076, 1035, MD1024; and lanthanide oxides.

The clear ink composition which is used in the inkjet recording method of the present invention can be produced by dispersing and mixing the above components by a suitable method. Separately prepared resins (resin emulsion), water, water-soluble organic solvents, saccharides, pH adjustors, preservatives or antimold agents are added, and satisfactorily dissolved to prepare an ink solution. After the satisfactory stirring, the mixture is filtered for the removal of coarse particles and foreign matter causative of clogging to prepare a contemplated ink composition.

The filtration may be preferably performed using a glass fiber filter as filtration materials. The glass fiber may be a resin-impregnated glass fiber from the viewpoint of electrostatic adsorption function. Further, a pore diameter of a glass fiber filter is preferably 1 to 40 microns, and more preferably 1 to 10 microns, and this is preferable from the viewpoint of productivity and adsorption removal such as charging isolated resins. Adsorption removal such as charging isolated resins is sufficiently performed and therefore can improve ejecting stability. Examples of the filter include Ultipor GF plus manufactured by Pall Corporation.

Colorant-Containing Ink Composition

The inkjet recording method of the invention may use a colorant-containing ink composition in addition to the clear ink composition. The colorant-containing ink composition may contain one or two or more kinds selected from a group consisting of a yellow ink composition, a magenta ink composition, a cyan ink composition and a black ink composition. According to one embodiment of preferable colorant-containing ink compositions of the invention, initial viscosity or viscosity variation after storage can be controlled, since an ink amount ejecting respective colors of ink can be stabilized over a long term period, at least contains the inorganic pigments in addition to one or two or more kinds selected from a group consisting of a yellow ink composition, a magenta ink composition, a cyan ink composition, and a black ink composition.

The colorant-containing ink composition which is used in an ink-jet recording method of the invention may include dyes or pigments but preferably pigments from the viewpoints of lightfastness and water resistance. The colorants preferably contain pigments and the following dispersants that can disperse the pigments in the ink. Anionic dispersion is preferable.

Examples of the pigments include inorganic pigments and organic pigments which can be used independently or in combination of two or more kinds. Examples of the organic pigments that can be used include azo pigments (azo lakes, insoluble azo pigments, condensed azo pigments, chelate azo pigments, or the like), polycyclic pigments (for example, phthalocyanine pigments, perylene pigments, perinone pigments, anthraquinone pigments, quinacridone pigments, dioxazine pigments, thioindigo pigments, isoindolinone pigments, quinophthalone pigments, or the like), dye chelates (for example, basic dye chelates, acidic dye chelates, or the like), nitro pigments, nitroso pigments, and aniline black, as well as carbon black produced by a known method such as a contact method, a furnace method, or a thermal method.

Specific examples of the pigments can be provided according to the type (color) of the ink composition to be obtained. Examples of the pigments for a yellow ink composition include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185. They may be used independently or in combination of two or more kinds. Among these, at least one selected from the group consisting of C.I. Pigment Yellow 74, 110, 128, and 129 is preferably used. Examples of the pigments for a magenta ink composition include C.I. Pigment Red 5, 7, 12, 48 (Ca), 48 (Mn), 57 (Ca), 57:1, 112, 122, 123, 168, 184, 202, 209; and C.I. Pigment Violet 19. They may be used independently or in combination of two or more kinds. Among these, at least one selected from the group consisting of C.I. Pigment Red 122, 202, and 209 and C.I. Pigment Violet 19 is preferably used. They may be a solid solution. Examples of the pigments for a cyan ink composition include C.I. Pigment Blue 1, 2, 3, 15:2, 15:3, 15:4, 15:34, 16, 22, and 60; and C.I. Vat Blue 4 and 60. They may be used independently or in combination of two or more kinds. Among these, C.I. Pigment Blue 15:3 and/or 15:4 is preferably used, and C.I. Pigment Blue 15:3 is particularly preferably used.

Examples of the pigment for a black ink composition include inorganic pigments including carbons such as lampblack (C.I. Pigment Black 6), acetylene black, furnace black (C.I. Pigment Black 7), channel black (C.I. Pigment Black 7), carbon black (C.I. Pigment Black 7) and the like and iron oxide pigments; and organic pigments such as aniline black (C.I. Pigment Black 1). In a preferred embodiment, carbon black is preferably used. Specific examples of the carbon black include #2650, #2600, #2300, #2200, #1000, #980, #970, #966, #960, #950, #900, #850, MCF-88, #55, #52, #47, #45, #45L, #44, #33, #32, and #30 (products of Mitsubishi Chemical Corporation), SpecialBlack 4A and 550, Printex 95, 90, 85, 80, 75, 45, and 40 (products of Degussa Corporation up to here), Regal 660, RmogulL, monarch 1400, 1300, 1100, 800, and 900 (products of Cabot Corporation up to here), Raven 7000, 5750, 5250, 3500, 3500, 2500 ULTRA, 2000, 1500, 1255, 1200, 1190 ULTRA, 1170, 1100 ULTRA, and Raven 5000 UIII (products of Columbian Chemicals Company up to here).

As the colorant-containing ink composition which may be used in the inkjet recording method of the invention, the concentration of the pigment is not particularly limited so long as the pigment concentration (content) can be adequately adjusted while preparing the ink composition.

The solid concentration of the pigment of the invention is preferably 1.0 to 10.0% by mass. From the viewpoint of color reproducibility, it is preferably 3.0 to 7.0% by mass, and from the viewpoint of granularity it is preferably 1.0 to 3.0% by mass. The colorant-containing ink composition which is used in the inkjet recording method of the invention is not specifically limited; various recording media, particularly non- or low absorbable recording media use the sparingly water-soluble alkanediol, the wetting agent, the amino group-containing resin in combination, which is preferable.

The colorant-containing ink composition which may be used in the inkjet recording method of the invention in the similar manner to the clear ink composition, includes (poly) oxyalkylene glycol, water soluble alkanediol, other solvents, surfactants, water, a penetrating agent, a solubilizer for a recording medium, nozzle clogging preventives, preservatives, antioxidants, electric conductivity adjustors, pH adjustors, viscosity modifiers, surface tension modifiers, oxygen absorbers, and ultraviolet absorbers, which may be further added to the clear ink composition which is used in the inkjet recording method of the present invention. These specific examples and additive amounts may be the same as the clear ink composition.

Dispersant

The colorant-containing ink composition which may be used in the inkjet recording method of the present invention preferably includes at least one resin selected from a group consisting of styrene-acrylic acid copolymer resins, oxyethyl acrylate resins, urethane resins, and fluorene resins, as a dispersing agent for dispersing a colorant; more preferably at least one resin selected from a group of consisting of oxyethyl acrylate resins and fluorene resins. These copolymer resins are adsorbed on a pigment to improve the dispersibility.

Specific examples of the hydrophobic monomer in the copolymer resin include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl acrylate, 2-hydroxypropyl methacrylate, 2-dimethyl aminoethyl acrylate, 2-dimethyl aminoethyl methacrylate, 2-diethyl aminoethyl acrylate, 2-diethyl aminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, formyl acrylate, formyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methyl styrene, vinyl toluene, and hydroxyethylated orthophenyl phenol acrylate. They may be used independently or in combination of two or more kinds.

Specific examples of hydrophilic monomers include acrylic acid, methacrylic acid, maleic acid, itaconic acid, and the like.

From the viewpoints of simultaneously achieving gloss of a color image, prevention of bronzing, and storage stability of the ink composition and at the same time enabling formation of a color image being yet more superior in terms of gloss, the copolymer resin of the hydrophobic and hydrophilic monomers preferably includes any of styrene-(meth)acrylic acid copolymerization resin, styrene-methyl styrene-(meth)acrylic acid copolymerization resin, or styrene-maleic acid copolymerization resin, (meth)acrylic acid-(meth)acrylic ester copolymerization resin, or styrene-(meth)acrylic acid-(meth)acrylic ester copolymerization resin, and hydroxyethylated orthophenyl phenol acrylic ester-(meth)acrylic acid copolymerization resin.

The copolymer resin may be a resin (styrene-acrylic acid resin) containing a polymer produced by reacting styrene with acrylic acid or an acrylic ester. Alternatively, the copolymer resin may be an acrylic acid-type water-soluble resin. Alternatively, salts thereof, for example, sodium, potassium, ammonium, triethanolamine, triisopropanolamine, triethylamine, or diethanolamine salts thereof, may also be used.

The acid value of the copolymer resin is preferably 50 to 320, more preferably 100 to 250, from the viewpoints of simultaneously achieving gloss of a color image, prevention of bronzing, and storage stability of the ink composition and at the same time enabling formation of a color image being more superior in terms of gloss.

The weight average molecular weight (Mw) of the copolymerization resin is preferably 2,000 to 30,000, more preferably 2,000 to 20,000, from the viewpoints of simultaneously achieving gloss of a color image, prevention of bronzing, and storage stability of the ink composition and at the same time enabling formation of a color image being more superior in terms of gloss.

The glass transition temperature (Tg; as measured according to JIS K 6900) of the copolymer resin is preferably 30° C. or above, more preferably 50 to 130° C., from the viewpoints of simultaneously achieving gloss of a color image, prevention of bronzing, and storage stability of the ink composition and at the same time enabling formation of a color image being more superior in terms of gloss.

The copolymer resin is adsorbed on the pigment or is free in a pigment dispersion and preferably has a maximum particle diameter of 0.3 µm or less and more preferably has an average particle diameter of 0.2 µm or less (further preferably 0.1 µm or less), from the viewpoints of simultaneously achieving gloss of a color image, prevention of bronzing, and storage stability of the ink composition and at the same time enabling formation of a color image being more superior in terms of gloss. Here, the average particle diameter is the average value of dispersion diameters of particles actually formed by the pigment in a dispersion (50% cumulative diameter) and can be measured with, for example, a Microtrac UPA (Microtrac Inc.).

The content of the copolymer resin is preferably 20 to 50 parts by weight, more preferably 20 to 40 parts by weight, based on 100 parts by weight of the pigment, from the viewpoints of simultaneously achieving gloss of a color image, prevention of bronzing, and storage stability of the ink composition and at the same time enabling formation of a color image being more superior in terms of gloss.

In the invention, oxyethyl acrylate-based resins can be used as the copolymerization resins. The use of such a resin provides a reduction in the initial viscosity of ink, excellent storage stability at high temperature, and an excellent property of recovering from clogging and therefore is further preferred.

The above-mentioned oxyethyl acrylate-based resin is not particularly limited, but is preferably a compound represented by the following Formula (II) as long as it has an oxyethyl acrylate skeleton. The compound represented by the following Formula (II) is, for example, a resin containing, in terms of the monomer mole ratio, 45 to 55% of ortho-hydroxyethylated phenylphenol acrylate having CAS No. 72009-86-0, 20 to 30% of acrylic acid having CAS No. 79-10-7, and 20 to 30% of methacrylic acid having CAS No. 79-41-4. These may be used independently or in combination of two or more kinds. Furthermore, the monomer composition ratio is not particularly limited, but is preferably 70 to 85% of the ortho-hydroxyethylated phenylphenol acrylate having CAS No. 72009-86-0, 5 to 15% of acrylic acid having CAS No. 79-10-7, and 10 to 20% of methacrylic acid having CAS No. 79-41-4.

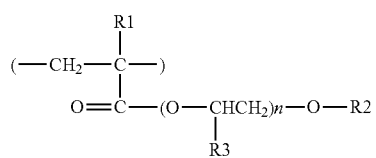

(II)

(in the Formula (II), $R_1$ and/or $R_3$ are a hydrogen atom or a methyl group, $R_2$ is an alkyl group or an aryl group, and n is an integer of 1 or more.)

Preferred examples of the compound represented by Formula (II) above include nonylphenoxypolyethylene glycol acrylate and polypropylene glycol #700 acrylate.

The content of the oxyethyl acrylate-based resin is preferably 10 to 40 parts by mass and further preferably 15 to 25 parts by mass based on 100 parts by mass of the pigment, from the viewpoints of simultaneously lowering the initial viscosity of an ink composition and achieving storage stability of the ink composition and at the same time preventing the formation of uneven aggregation and enabling formation of a color image excellent in terms of a penetration property.

In the above-mentioned oxyethyl acrylate-based resin, the total composition ratio of the resins derived from monomers having hydroxyl groups selected from the group consisting of acrylic acids and methacrylic acids is preferably 30 to 70% and further preferably 40 to 60%, from the viewpoints of simultaneously lowering the initial viscosity of an ink composition and achieving storage stability of the ink composition and at the same time achieving the property of recovering from clogging.

The number average molecular weight (Mn) of the oxyethyl acrylate-based resin before cross-linking is preferably 4000 to 9000 and more preferably 5000 to 8000, from the viewpoints of simultaneously lowering the initial viscosity of an ink composition and achieving storage stability of the ink composition. The Mn is measured by, for example, GPC (gel permeation chromatography).

The oxyethyl acrylate-based resin is adsorbed on the pigment or is free in a pigment dispersion, and the copolymer resin preferably has a maximum particle diameter of 0.3 μm or less and more preferably has an average particle diameter of 0.2 μm or less (further preferably 0.1 μm or less), from the viewpoints of simultaneously achieving gloss of a color image, prevention of bronzing, and storage stability of the ink composition and at the same time enabling formation of a color image being more superior in terms of gloss. Here, the average particle diameter is the average value of dispersion diameters of particles actually formed by the pigment in a dispersion (50% cumulative diameter) and can be measured with, for example, a Microtrac UPA (Microtrac Inc.).

The content of the oxyethyl acrylate-based resin is preferably 20 to 50 parts by mass and further preferably 20 to 40 parts by mass based on 100 parts by mass of the pigment, from the viewpoints of simultaneously achieving gloss of a color image, prevention of bronzing, and storage stability of the ink composition and at the same time enabling formation of a color image being more superior in terms of gloss.

Furthermore, in a colorant-containing ink composition which may be used in the inkjet recording method of the invention, by using a urethane-based resin as a fixative pigment dispersant, gloss of a color image, prevention of bronzing, and storage stability of the ink composition are simultaneously achieved, and at the same time the color image can be formed so as to have superior gloss. The urethane-based resin is a resin containing a polymer obtained by a reaction of a diisocyanate compound and a diol compound and, in the invention, is preferably a resin having a urethane bond and/or an amide bond and an acid group.

Examples of the diisocyanate compound include aromatic diisocyanate compounds such as hexamethylene diisocyanate and 2,2,4-trimethyl hexamethylene diisocyanate, aromatic diisocyanate compounds such as toluoylene diisocyanate and phenylmethane diisocyanate, and modified derivatives thereof.

Examples of the diol compound include polyethers such as polyethylene glycol and polypropylene glycol, polyesters such as polyethylene adipate and polybutylene adipate, and polycarbonates.

The acid value of the urethane resin is preferably 10 to 300, more preferably 20 to 100, from the viewpoints of simultaneously achieving gloss of a color image, prevention of bronzing, and storage stability of the ink composition and at the same time enabling formation of a color image being more superior in terms of gloss. The acid value is the amount (mg) of KOH necessary for neutralizing 1 g of resin.

The weight average molecular weight (Mw) of the urethane resin before crosslinking is preferably 100 to 200,000, more preferably 1,000 to 50,000, from the viewpoints of simultaneously achieving gloss of a color image, prevention of bronzing, and storage stability of the ink composition and at the same time enabling formation of a color image being more superior in terms of gloss. The weight average molecular weight (Mw) is measured by gel permeation chromatography (GPC)

The glass transition temperature (Tg: measured in accordance with JIS K6900) of the urethane resin is preferably −50 to 200° C., and further preferably −50 to 100° C. from the viewpoints of simultaneously achieving gloss of a color image, prevention of bronzing, and storage stability of the ink composition and at the same time enabling formation of a color image being more superior in terms of gloss.

The urethane-based resin preferably has a carboxyl group.

The content of the urethane-based rein is preferably 20 to 50 parts by mass and further preferably 20 to 40 parts by mass based on 100 parts by mass of the pigment from the viewpoints of simultaneously achieving gloss of a color image, prevention of bronzing, and storage stability of the ink composition and at the same time enabling formation of a color image being more superior in terms of gloss.

Furthermore, in the invention, a fluorene-based resin can be used as a fixative pigment dispersant. The use of the resin provides a reduction in the initial viscosity of ink, storage stability at high temperature, and an excellent fixing property to printing paper, and therefore it is preferable.

In addition, the fluorene-based resin is not restricted, as long as the resin has a fluorene skeleton, and can be obtained by, for example, copolymerizing the following monomer units:

5-isocyanate-1-(isocyanatomethyl)-1,3,3-trimethyl cyclohexane (CAS No. 4098-71-9);

2,2'-[9H-fluoren-9-ylidenebis(4,1-phenyleneoxy)]bis-ethanol, (CAS No. 117344-32-8);

3-hydroxy-2-(hydroxymethyl)-2-methyl propionic acid, (CAS No. 4767-03-7); or

N,N-diethylethanamine, (CAS No. 121-44-8).

As the fluorene-based resin, the monomer composition ratio is not particularly limited so long as it has a fluorine skeleton, but is preferably 35 to 45% by mass of 5-isocyanato-1-(isocyanatomethyl)-1,3,3-trimethylcyclohexane (CAS No. 4098-71-9), 40 to 60% by mass of 2,2'-[9H-fluoren-9-ylidenebis(4,1-phenyleneoxy)]bis-ethanol (CAS No. 117344-32-8), 5 to 15% by mass of 3-hydroxy-2-(hydroxymethyl)-2-methyl propionic acid (CAS No. 4767-03-7), and 5 to 15% of N,N-diethylethanamine (CAS No. 121-44-8).

The number average molecular weight (Mn) of the fluorene-based resin before cross-linking is preferably 2000 to 5000 and more preferably 3000 to 4000 from the viewpoints of simultaneously achieving the initial viscosity of the ink composition and the storage stability of the ink composition. The Mn is measured by, for example, Gel Permeation Chromatography (GPC).

The fluorene-based resin is adsorbed on the pigment or is free in a pigment dispersion, and the copolymer resin preferably has a maximum particle diameter of 0.3 µm or less and more preferably has an average particle diameter of 0.2 µm or less (further preferably 0.1 µm or less), from the viewpoints of simultaneously achieving gloss of a color image, prevention of bronzing, and storage stability of the ink composition and at the same time enabling formation of a color image being more superior in terms of gloss. Here, the average particle diameter is the average value of dispersion diameters of particles actually formed by the pigment in a dispersion (50% cumulative diameter) and can be measured with, for example, a Microtrac UPA (Microtrac Inc.).

The content of the fluorene-based resin is preferably 20 to 50 parts by mass and further preferably 20 to 40 parts by mass based on 100 parts by weight of the pigment from the viewpoints of simultaneously achieving a color image-fixing property, prevention of bronzing, and storage stability of the ink composition and at the same time enabling formation of a color image being more superior in terms of gloss.

The mass ratio of the copolymer resin and the fixative pigment dispersant (the former/the latter) is preferably 1/2 to 2/1 and is further preferably 1/1.5 to 1.5/1 from the viewpoints of simultaneously achieving gloss of a color image, prevention of bronzing, and storage stability of the ink composition and at the same time enabling formation of a color image being more superior in terms of gloss.

The mass ratio of the solid content of the pigment and the total solid content of the copolymer resin and the fixative pigment dispersant (the former/the latter) is preferably 100/40 to 100/100 from the viewpoints of simultaneously achieving gloss of a color image, prevention of bronzing, and storage stability of the ink composition and at the same time enabling formation of a color image being more superior in terms of gloss.

Furthermore, a surfactant may be used as the dispersant. Examples of the surfactant include anionic surfactants such as fatty acid salts, higher alkyl dicarboxylates, higher alcohol sulfates, higher alkyl sulfonates, condensation products of higher fatty acids and amino acids, sulfosuccinates, naphthenates, liquid fatty oil sulfates, and alkylallyl sulfonates; cationic surfactants such as fatty acid amine salts, quaternary ammonium salts, sulfonium salts, and phosphonium; and nonionic surfactants such as polyoxyethylene alkyl ethers, polyoxyethylene alkyl esters, sorbitan alkyl esters, and polyoxyethylene sorbitan alkyl esters. It is needless to say that these surfactants function as surfactants when they are added to ink compositions.

The colorant-containing ink composition which may be used in the inkjet recording method of the present invention can be produced by dispersing and mixing the above components by a suitable method. Preferably, an ink solution is prepared by first mixing the pigment, the polymeric dispersant, and water together with a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion liquid, then adding, for example, separately prepared resins (resin emulsion), water, water-soluble organic solvents, saccharides, pH adjustors, preservatives and antimolds, and satisfactorily dissolving the components. After the satisfactory stirring, the mixture is filtered for the removal of coarse particles and foreign matter causative of clogging to prepare a contemplated ink composition. The filtration may be preferably performed using a glass fiber filter as filtration materials. The glass fiber may be a resin-impregnated glass fiber from the viewpoint of electrostatic adsorption function. Further, a pore diameter of glass fiber filter is preferably 1 to 40 microns, and more preferably 1 to 10 microns, and this is preferable from the viewpoint of productivity and adsorption removal such as charging isolated resins. Adsorption removal such as charging isolated resins is sufficiently performed and therefore can improve ejecting stability. Examples of the filter include Ultipor GF plus manufactured by Pall Corporation.

Recording Medium

In the inkjet recording method according to the present invention, a recording medium to be recorded is not particularly limited, and for example includes non- or low absorbable recording media in addition to a recording medium having a plain paper or an aqueous ink-receiving layer.

Non or Low Absorbable Recording Medium

Examples of the non-absorbable recording medium include a plastic film which does not conduct a surface treatment for ink jet recording (that is to say, having no ink-receiving layer), a plastic which is coated or a plastic film which is attached on substrates such as papers. Herein, examples of the plastic include polyvinyl chloride, polyethylene terephthalate, polycarbonate, polystyrene, polyurethane, polyethylene, polypropylene, and the like.

Examples of the low-absorbable recording medium include a coated paper, a recording sheet (printing paper) such as a fine coated paper, an art paper, a coat paper, a mat paper, a or cast paper.

A coated paper is a paper obtained by applying coating materials on the surface, to increase aesthetic property or smoothness. The coating materials can be prepared by mixing pigments such as talc, pyrophyllite, clay (kaolin), titanium oxide, magnesium carbonate, calcium carbonate, and adhesives such as starch, and polyvinyl alcohol. The coating material is applied using a machine such as a coater in a manufacturing process of paper, or the like. Coaters include an on machine type for a first process, which is paper machining and coating by directly connecting a paper machine, and an off machine type other than paper machining, which is used in recording, "Industrial statistic CLASS" of Ministry of Economy, Trade and Industry is classified into printing coated paper.

Fine coated paper means a recording paper having the amount of coating materials of 12 $g/m^2$ or less. Art paper is a recording paper applying coating materials of about 40 $g/m^2$ to advanced recording paper (high-quality paper, chemical pulp content: 100% of paper). Coated paper is a recording paper applying coating materials of about 20 $g/m^2$-40 $g/m^2$. Cast paper means that pressure is applied on the surface of art paper or coat paper in a machine called a cast drum, to thereby form a finished recording paper so as to increase gloss or recording effect.

In the recording method according to the invention, it is preferable to use synthetic paper or printing paper (OKT+: manufactured by Oji Paper Co., Ltd.) as the recording medium having no water absorbability or low water absorbability. Especially, on art paper, paper for high image quality used in POD (print on demand), and exclusive paper for laser printers, in particular, even in a case of low-resolution printing, a high-quality image free of bleeding and beading can be formed. Examples of the paper for high image quality used in POD include Ricoh Business Coat Gloss 100 (manufactured by Ricoh Company, Ltd.). In addition, examples of the exclusive paper for laser printers include LPCCTA4 (manufactured by Seiko Epson Corp.). Examples of the waterproof paper include Kareka (product of Mitsubishi Kagaku Media Co., Ltd.) and Laser Peach (product of Nisshinbo Postal Chemical Co., Ltd.).

Inkjet Recording Apparatus

One embodiment of the invention will be described below based on FIGURE as an example using an inkjet type printer as a recording apparatus.

As shown in FIGURE, an inkjet type printer 1 (hereinafter, referred to as printer 1) as a recording apparatus has a frame 2. A platen 3 is provided in the frame 2. To the platen 3, paper P is fed by driving of a recording medium feeding motor 4. In the frame 2, a rod shape of guide member 5 is provided in parallel to a longitudinal direction of the platen 3.

A carriage 6 is supported in the guide member 5 so as to move reciprocably in direction of the axis thereof. The carriage 6 is connected to a carriage motor 8 through a timing belt 7 provided in the frame 2. The carriage 6 reciprocably moves along the guide member 5 by driving the carriage motor 8.

A head 9 is provided in the carriage 6, in which an ink cartridge 10 for feeding ink as liquid to the head 9 is detachably placed. The ink in the ink cartridge 10 is fed to the head 9 from the ink cartridge 10 by driving a piezo device (not shown) provided therein, and ejected on paper P fed from a plurality of nozzles on the surface of the head 9 to the platen 3. Thereby, recording matter can be produced.

Examples of the recording method include a thermal jet (bubble jet) method. Any of known methods can be used.

EXAMPLES

The invention will be specifically described by Examples, but is not limited to Examples.

Allylamine is designated to "AA", N,N-dimethylallylamine is designated to "DMAA", and N,N-diallylmethylamine is designated to "DAMA". Unless otherwise specified, "%" refers to "% by mass".

Measurement of Weight Average Molecular Weight of Polymer

A weight average molecular weight (Mw) of a polymer was measured by gel permeation chromatography (GPC method) using a HITACH L-6000 high-performance liquid chromatograph. Hitachi L-6000 as an eluent line pump, a Shodex RI SE-61 differential refractive index detector as a detector, and one which connects Asahipak water-based gel filtration type GS-220HQ (exclusion limit molecular weight 3,000) and GS-620HQ (exclusion limit molecular weight 2,000,000) as a column were used. Samples were used in an amount of 20 μL in a concentration of 0.5 g/100 ml in eluent. 0.4 mol/L of aqueous sodium chloride solution was used as an eluent. GPC measurement was performed at a column temperature of 30° C. and a flow rate of 1.0 ml/min. A calibration curve was obtained using polyethylene glycol with molecular weights of 106, 194, 440, 600, 1470, 4100, 7100, 10300, 12600, 23000 as standard samples and a Mw of a polymer was determined in terms of the calibration curve.

Preparation of Modified Polyallylamine

Preparation Example 1

Preparation of Modified PAA-1 (Copolymer of DAMA and AA (5/5))

To a 2000 mL four-neck flask equipped with a stirrer, a Dimroth condenser, and a thermometer, were charged 159.10 g of aqueous monoallylamine hydrochloride solution having a concentration of 58.80%, 212.20 g of aqueous N,N-diallylmethylamine hydrochloride solution having a concentration of 69.58%, and 834.70 g of distilled water. The aqueous monomer solution was heated to 65° C., 54.24 g of 2,2'-azobis (2-amidinopropan)dihydrochloride as a radical initiator was added thereto, followed by polymerization for 48 hours.

After completion of polymerization, 193.30 g of aqueous sodium hydroxide solution having a concentration of 50% was added dropwise under iced cooling and neutralized with hydrochloric acid. After completion of neutralization, unreacted monomer was evaporated at 50° C. under reduced pressure (10.6 kPa).

The resultant solution was subjected to electrodialysis to remove salts, to obtain 1055.43 g of aqueous copolymer solution (copolymerization ratio 5:5) of free type N,N-dimethylallylamine having a concentration of 14.35% and allylamine.

A portion of the aqueous copolymer solution was made into a hydrochloride, and re-precipitated in an isopropanol solvent, to obtain copolymer hydrochloride. A result of elemental analysis was C=50.02, H=9.01, N=11.32. These values were consistent with calculated values of C=49.80, H=9.19, N=11.64.

Preparation Example 2a

Preparation of Modified PAA-2a (Copolymer of DAMA and Carbamoylation AA (5/5))

To a 1000 mL four-neck flask equipped with a stirrer, a Dimroth condenser, and a thermometer, were charged the obtained 586.35 g of aqueous copolymer solution of free type N,N-diallylmethylamine having a concentration of 14.35% prepared in Preparation Example 1 and allylamine, and then 104.17 g of hydrochloric acid having a concentration of 35% was added dropwise under iced cooling. Subsequently, the solution was heated to 50° C., 455.07 g of aqueous sodium cyanide solution having a concentration of 7.5% was added dropwise, and then reacted for 24 hours.

After completion of reaction, 42.00 g of sodium hydroxide having a concentration of 50% was added dropwise under iced cooling, and then unreacted hydrochloric acid was neutralized.

The resultant solution was subjected to electrodialysis to remove salts, to obtain 907.00 g (yield 97%) of aqueous copolymer solution (copolymerization ratio 5:5) of free type N,N-diallylmethylamine having a concentration of 11.30% and carbamoylationallylamine. A weight average molecular weight of the copolymer was 1800.

The copolymer was condensed and solidified, and the 10% solubility to various solvent was investigated. As a result, the polymer was found to be insoluble in acetone or acetonitrile, but soluble in methanol, ethanol, isopropanol, DMSO, or DMF. As a result, the copolymer of the invention was soluble even in an organic solvent in comparison to allylamine polymer.

A portion of the aqueous copolymer solution was made into a hydrochloride, and re-precipitated in an acetone solvent, to obtain copolymer hydrochloride. The result shows that modified polyallylamine of the invention can form a cationic polymer.

A result of elemental analysis was C=53.58, H=8.92, N=16.64. These values were consistent with calculated values of C=53.32, H=8.95, N=16.96. As a result of calculating carbamoylation mole fraction by neutralization titration of copolymer hydrochloride, it was 46.76% and was almost consistent with a result of elemental analysis.

Preparation Example 2b

Preparation of Modified PAA-2b (Copolymer of DAMA and Carbamoylation AA (3/7))

889.95 g of an aqueous copolymer (copolymerization ratio 3:7) solution of free type N,N-diallylmethylamine having a concentration of 14.50% and allylamine was obtained, in the same manner as Preparation Example 1, except that 127.32 g of aqueous N,N-diallylmethylamine hydrochloride solution having a concentration of 69.58%, 222.75 g of monoallylamine having a concentration of 58.80%, and 747.78 g of distilled water were used.

853.10 g (yield 95%) of an aqueous copolymer (copolymerization ratio 3:7) solution of free type N,N-diallylmethylamine having a concentration of 11.52% and carbanoylationallylamine was obtained, in the same manner as Preparation Example 2a, except that 505.67 g of the aqueous copolymer solution, 637.10 g of aqueous sodium cyanide solution, and 25.20 g of aqueous sodium hydroxide solution were used. A weight average molecular weight of the copolymer was 1500.

Preparation Example 2c

Preparation of Modified PAA-2c (Copolymer of DAMA and Carbamoylation AA (7/3))

1218.26 g of an aqueous copolymer (copolymerization ratio 7:3) solution of free type N,N-diallylmethylamine having a concentration of 14.81% and allylamine was obtained, in the same manner as Preparation Example 1 except that 297.08 g of aqueous N,N-diallylmethylamine hydrochloride solution having a concentration of 69.58%, 95.46 g of monoallylamine having a concentration of 58.80%, and 921.66 g of distilled water were used.

940.95 g (yield 97%) of an aqueous copolymer (copolymerization ratio 7:3) solution of free type N,N-diallylmethylamine having a concentration of 11.12% and carbanoylationallylamine was obtained, in the same manner as Preparation Example 2a except that 641.18 g of the aqueous copolymer solution, 273.04 g of aqueous sodium cyanide solution, and 58.80 g of aqueous sodium hydroxide solution were used. A weight average molecular weight of the polymer was 2100.

Preparation Example 3

Preparation of Modified PAA-3 (Copolymer of DAMA and Methoxycarbonylation AA (5/5))

To a 1000 mL four-neck flask equipped with a stirrer, a Dimroth condenser, and a thermometer, were charged the obtained 586.35 g of aqueous copolymer solution of free type N,N-diallylmethylamine having a concentration of 14.35% prepared in Preparation Example 1 and allylamine, and then, the solution was heated to 50° C., 47.77 g of dimethyl carbonate having a purity of 99% was added dropwise, and then reacted for 24 hours.

After completion of reaction, methanol as a by-product was removed at 50° C. under reduced pressure (80 mmHg), to obtain 494.19 g (yield 98%) of an aqueous copolymer (copolymerization ratio 5:5) solution of free type N,N-diallylmethylamine having a concentration of 22.44% and carbanoylationallylamine. A weight average molecular weight of the polymer was 1900.

A portion of the aqueous copolymer solution was made into an hydrochloride, and re-precipitated in an isopropanol solvent, to obtain copolymer hydrochloride. A result of elemental analysis was C=54.69, H=8.62, N=10.37. These values were consistent with calculated values of C=54.85, H=8.82, N=10.66. As a result of calculating methoxycarbonylation mole fraction by neutralization titration of copolymer hydrochloride, it was 49.88% and was almost consistent with a result of elemental analysis.

Preparation Example 4

Preparation of Modified PAA-4 (Copolymer of DAMA and Acetylation AA (5/5))

To a 1000 mL four-neck flask equipped with a stirrer, a Dimroth condenser, and a thermometer, were charged the obtained 586.35 g of aqueous copolymer solution of free type N,N-diallylmethylamine having a concentration of 14.35% prepared in Preparation Example 1 and allylamine, and then under iced cooling, 54.69 g of acetic anhydride having a purity of 98% was added dropwise in an amount of 1/2 of the molar amount of allylamine, and neutralized with 42.00 g of sodium hydroxide having a concentration of 50% corresponding to the molar amount of acetic acid as a by-product, the operation was repeatedly performed and the whole amount of acetic anhydride was added dropwise, and then reacted for 24 hours.

The resultant solution was subjected to electrodialysis to remove salts, to obtain 695.50 g (yield 100%) of aqueous copolymer solution (copolymerization ratio 5:5) of free type N,N-diallylmethylamine having a concentration of 15.12% and acetylationallylamine. A weight average molecular weight of the copolymer was 1900.

A portion of the aqueous copolymer solution was made into an hydrochloride, and re-precipitated in isopropanol solvent, to obtain copolymer hydrochloride. A result of elemental analysis was C=58.31, H=9.16, N=11.07. These values were consistent with calculated values of C=58.41, H=9.40, N=11.35. As a result of calculating acetylation mole fraction by neutralization titration of copolymer hydrochloride, it was 50.06% and was almost consistent with a result of elemental analysis.

Preparation Example 5

Preparation of Modified PAA-5 (Copolymer of DAMA and Monocarbamoylethylation AA (5/5))

To a 1000 mL four-neck flask equipped with a stirrer, a Dimroth condenser, and a thermometer, were charged the obtained 586.35 g of aqueous copolymer solution of free type N,N-diallylmethylamine having a concentration of 14.35% prepared in Preparation Example 1 and allylamine, and then the solution was heated to 50° C., 74.63 g of acrylamide having a concentration of 50% was added dropwise, and then reacted for 24 hours. Thereby, 631.93 g (yield 98%) of aqueous copolymer solution (copolymerization ratio 5:5) of free type N,N-diallylmethylamine having a concentration of 18.56% and monocarbamoylethylation allylamine were obtained. A weight average molecular weight of the copolymer was 1800.

A portion of the aqueous copolymer solution was made into an hydrochloride, and re-precipitated in an isopropanol solvent, to obtain copolymer hydrochloride. A result of elemental analysis was C=56.48, H=8.99, N=15.38. These values were consistent with calculated values of C=56.61, H=9.50, N=15.24. As a result of calculating monopropylamidation mole fraction by neutralization titration of copolymer hydrochloride, it was 49.03% and was almost consistent with a result of elemental analysis.

Preparation Example 6

Preparation of Modified PAA-6 (Copolymer of DAMA and Dicarbamoylethylation AA (5/5))

647.03 g (yield 97%) of an aqueous copolymer (copolymerization ratio 5:5) solution of free type N,N-diallylmethylamine having a concentration of 23.27% and dicarbamoylethylationallylamine was obtained, in the same manner as Preparation Example 5, except that 149.27 g of acrylamide was used. A weight average molecular weight of the copolymer was 1800.

A portion of the aqueous copolymer solution was made into an hydrochloride, and re-precipitated in an isopropanol solvent, to obtain copolymer hydrochloride. A result of elemental analysis was C=55.18, H=8.75, N=15.81. These values were consistent with calculated values of C=55.40, H=9.01, N=16.15. As a result of calculating dipropylamidation mole fraction by neutralization titration of copolymer hydrochloride, it was 48.71% and was almost consistent with a result of elemental analysis.

Preparation Example 7

Preparation of Modified PAA-7 (Copolymer of DAMA and Monoethoxy-2-Hydroxypropylation AA (5/5))

To a 1000 mL four-neck flask equipped with a stirrer, a Dimroth condenser, and a thermometer, were charged the obtained 586.35 g of aqueous copolymer solution of free type N,N-diallylmethylamine having a concentration of 14.35% prepared in Preparation Example 1 and allylamine, and then the solution was heated to 50° C., 53.62 g of ethylglycidyl ether having a purity of 100% was added dropwise, and then reacted for 24 hours. Thereby, 614.87 g (yield 100%) of aqueous copolymer solution (copolymerization ratio 5:5) of free type N,N-diallylmethylamine having a concentration of 21.99% and monoethoxy-2-hydroxypropylation allylamine were obtained. A weight average molecular weight of the copolymer was 1800.

A portion of the aqueous copolymer solution was made into an hydrochloride, and re-precipitated in an isopropanol solvent, to obtain copolymer hydrochloride. A result of elemental analysis was C=58.50, H=9.99, N=9.08. These values were consistent with calculated values of C=58.71, H=10.18, N=9.13. As a result of calculating monoethoxy-2-hydroxypropylation mole fraction by neutralization titration of copolymer hydrochloride, it was 50.12% and was almost consistent with a result of elemental analysis.

Preparation Example 8

Preparation of Modified PAA-8 (Copolymer of DAMA and Diethoxy-2-Hydroxypropylation AA (5/5))

644.36 g (yield 99%) of an aqueous copolymer (copolymerization ratio 5:5) solution of free type N,N-diallylmethylamine having a concentration of 28.62% and diethoxy-2-hydroxypropylationallylamine was obtained, in the same manner as Preparation Example 7, except that 107.24 g of ethylglycidyl ether was used. A weight average molecular weight of the copolymer was 1800.

A portion of the aqueous copolymer solution was made into an hydrochloride, and re-precipitated in isopropanol solvent, to obtain copolymer hydrochloride. A result of elemental analysis was C=58.56, H=9.98, N=6.73. These values were consistent with calculated values of C=58.73, H=10.10, N=6.85. As a result of calculating diethoxy-2-hydroxypropylation mole fraction by neutralization titration of copolymer hydrochloride, it was 49.71% and was almost consistent with a result of elemental analysis.

Preparation Example 9

Preparation of Modified PAA-9 (Ternary Copolymer of DAMA, AA and Carbamoylation AA (5/3/2))

817.70 g (yield 99%) of an aqueous copolymer (copolymerization ratio 5:3:2) solution of free type N,N-diallylmethylamine having a concentration of 11.75%, monocarbamoylethylationallylamine, and allylamine was obtained, in the same manner as Preparation Example 2a, except that 273.04 g of aqueous sodium cyanide solution and 58.80 g of aqueous sodium hydroxide solution were used. A weight average molecular weight of the copolymer was 1800.

Preparation Example 10

Preparation of Modified PAA-10 (Ternary Copolymer of DAMA, AA and Methoxycarbonylation AA (5/3/2))

494.19 g (yield 98%) of an aqueous copolymer (copolymerization ratio 5:3:2) solution of free type N,N-diallylmethylamine having a concentration of 19.33%, methoxycarbonylationallylamine, and allylamine was obtained, in the same manner as Preparation Example 3, except that 28.66 g of dimethyl carbonate was used. A weight average molecular weight of the copolymer was 1800.

Preparation Example 11

Preparation of Modified PAA-11 (Ternary Copolymer of DAMA, AA and Acetylation AA (5/3/2))

704.15 g (yield 100%) of an aqueous copolymer (copolymerization ratio 5:3:2) solution of free type N,N-diallylmethylamine having a concentration of 13.74%, acetylationallylamine, and acetylationallylamine was obtained, in the same manner as Preparation Example 4, except that 32.81 g of acetic anhydride and 25.20 g of aqueous sodium hydroxide solution were used. A weight average molecular weight of the copolymer was 1800.

Preparation Example 12

Preparation of Modified PAA-12 (Ternary Copolymer of DAMA, AA and Monocarbamoylethylation AA (5/3/2))

611.07 g (yield 98%) of an aqueous copolymer (copolymerization ratio 5:3:2) solution of free type N,N-diallylmethylamine having a concentration of 17.26%, monocarbamoylethylationallylamine, and allylamine was obtained, in the same manner as Preparation Example 5, except that 44.78 g of acrylamide was used. A weight average molecular weight of the copolymer was 1800.

Preparation Example 13

Preparation of Modified PAA-13 (Ternary Copolymer of DAMA, Monoethoxy-2-Hydroxypropylation AA and AA (5/3/2))

586.51 g (yield 100%) of an aqueous copolymer (copolymerization ratio 5:3:2) solution of free type N,N-diallylmethylamine having a concentration of 19.57%, monoethoxy-2-hydroxypropylationallylamine, and allylamine was obtained, in the same manner as Preparation Example 7, except that 32.17 g of ethylglycidyl ether was used. A weight average molecular weight of the copolymer was 1800.

Preparation Example 14

Preparation of Modified PAA-14 (Ternary Copolymer of DAMA, DMAA, and Carbamoylation AA (1/1/1))

To a 1000 mL four-neck flask equipped with a stirrer, a Dimroth condenser, and a thermometer were charged 212.20 g of aqueous N,N-diallylmethylamine hydrochloride solution having a concentration of 69.58%, 191.66 g of aqueous N,N-dimethylallylamine hydrochloride solution having a concentration of 63.45%, 159.10 g of aqueous monoallylamine hydrochloride solution having a concentration of 58.80%, and 646.40 g of distilled water. The aqueous monomer solution was heated to 65° C., 54.24 g of 2,2'-azobis(2-amidinopropan)dihydrochloride as a radical polymerization agent was added thereto, followed by polymerization for 48 hours.

After completion of reaction, 273.28 g of aqueous sodium hydroxide solution having a concentration of 50% was added dropwise under iced cooling and neutralized with hydrochloric acid. After neutralization completion, un-reacted monomer was evaporated at 50° C. under reduced pressure (10.6 kPa).

The resultant solution was subjected to electrodialysis to remove salts, to obtain 1504.87 g of aqueous copolymer solution (copolymerization ratio 1:1:1) of free type N,N-diallylmethylamine having a concentration of 14.82%, N,N-dimethylallylamine and allylamine.

104.17 g of Hydrochloric acid having a concentration of 35% was added dropwise to 570.04 g of the resultant aqueous copolymer solution under iced cooling, subsequently heated to 50° C., 300.35 g of aqueous sodium cyanide solution having a concentration of 7.5% was added dropwise, and reacted for 24 hours.

The resultant solution was subjected to electrodialysis to remove salts, to obtain 782.09 g (yield 96%) of aqueous copolymer solution (copolymerization ratio 1:1:1) of free type N,N-diallylmethylamine having a concentration of 12.13%, N,N-dimethylallylamine and carbamoylationallylamine. A weight average molecular weight of the copolymer was 1700.

A portion of the aqueous copolymer solution was made into an hydrochloride, and re-precipitated in isopropanol solvent, to obtain copolymer hydrochloride. A result of elemental analysis was C=51.83, H=9.13, N=14.97. These values were consistent with calculated values of C=52.03, H=9.28, N=15.17. As a result of calculating carbamoylation mole fraction by neutralization titration of copolymer hydrochloride, it was 31.84% and was almost consistent with a result of elemental analysis.

Preparation of Clear Ink Composition

Respective components were mixed according to the composition of the following Table 1, and filtered with a 10 μm membrane filter to prepare respective inks. The numerical value in the following Table 1 represents content (% by mass) in ink. Further, the modified polyallylamine (referred to as "modified PAA" in Table) represents a solid content (% by mass).

Further, a surfactant which is used in inks A1 to A58 is polyorganosiloxane-based surfactant. The surfactant consists of a compound where, in the formula (I), R is a methyl group, a is an integer of 6 to 18, m is an inter of 0, n is an integer of 1; a compound where, in the formula (I), R is a hydrogen atom, a is an integer of 7 to 11, m is an inter of 30 to 50, n is an integer of 3 to 5; a compound where, in the formula (I), R is a methyl group, a is an integer of 9 to 13, m is an inter of 2 to 4, n is an integer of 1 to 2. In the case where the surfactant is an aqueous solution containing 20% by mass of glycerin, 10% by mass of 1,2-hexanediol, 0.1% by mass of the surfactant and 69.9% by mass of water, a dynamic surface tension of the aqueous solution at 1 Hz was 26 mN/m or less. Specifically a dynamic surface tension at 1 Hz (=One bubble/second) was measured using a Bubble Pressure Tensiometer BP2 (manufactured by KRUSS GmbH) so that the dynamic surface tension at 1 Hz in the aqueous solution was 24.6 mN/m.

A surfactant (polyoganosiloxane-based) which is used in ink B1, B6 to B8, B9 and B14 to B16 was the same as the polyorganosiloxane-based surfactant used in ink A1 to A58.

In a case where an acetylene glycol-based surfactant SURFINOL 104 (2,4,7,9-tetramethyl-5-decyne-4,7-diol, manufactured by Nissin Chemical Industry Co., Ltd.) used in inks B2 and B10 forms an aqueous solution containing 20% by mass of glycerin, 10% by mass of 1,2-hexanediol, 0.1% by mass of the surfactant and 69.9% by mass of water, a dynamic surface tension of the aqueous solution at 1 Hz was 27 mN/m or higher. Specifically a dynamic surface tension at 1 Hz (=One bubble/second) was measured using a Bubble Pressure Tensiometer BP2 (manufactured by KRUSS GmbH) so that the dynamic surface tension at 1 Hz in the aqueous solution was 27.8 mN/m.

In a case where an acetylene glycol-based surfactant SURFINOL 465 (ethylene oxide additive of 2,4,7,9-tetramethyl-5-decyne-4,7-diol, manufactured by Nissin Chemical Industry Co., Ltd.) used in inks B3 and B11 forms an aqueous solution containing 20% by mass of glycerin, 10% by mass of 1,2-hexanediol, 0.1% by mass of the surfactant and 69.9% by mass of water, a dynamic surface tension of the aqueous solution at 1 Hz was 27 mN/m or higher.

Specifically a dynamic surface tension at 1 Hz (=One bubble/second) was measured using a Bubble Pressure Tensiometer BP2 (manufactured by KRUSS GmbH) so that the dynamic surface tension at 1 Hz in the aqueous solution was 27.5 mN/m.

A surfactant which is used in inks B4 and B12 uses polyorganosiloxane-based surfactant BYK347 manufactured by BYK additives and Instruments. A surfactant which is used in inks B5 and B13 uses polyorganosiloxane-based surfactant BYK348 manufactured by BYK additives and Instruments.

Tripropylene glycol is tripropylene glycol manufactured by Asahi Kasei Chemicals Corp. Further, trehalose in the following Table 1 is TREHA fine powder manufactured by Hayashibara Shoji Inc. AQUACER593 used is one manufactured by BYK additives and Instruments. Triethylene glycol monomethyl ether used Highmol™ manufactured by Toho Chemical Industries Ltd.

TABLE 1

| Clear ink | Ink A1 | Ink A2 | Ink A3 | Ink A4 | Ink A5 | Ink A6 | Ink A7 | Ink A8 |
|---|---|---|---|---|---|---|---|---|
| 1,2-Octanediol | 3 | 3 | 3 | 3 | 3 | 3 | 3 | 3 |
| Tripropylene glycol | 6 | 6 | 6 | 12 | 12 | 12 | 18 | 18 |
| Trehalose | 12 | 24 | 36 | 12 | 24 | 36 | 12 | 24 |
| Glycerin | 5 | 5 | 5 | 5 | 5 | 5 | 5 | 5 |
| 1,2-Hexanediol | 1 | 1 | 1 | 1 | 1 | 1 | 1 | 1 |
| Surfactant | 0.3 | 0.3 | 0.3 | 0.3 | 0.3 | 0.3 | 0.3 | 0.3 |
| Copolymer (copolymerization ratio 5:5) of free type N,N-diallylmethylamine and carbamoylated allylamine | 2.4 | 2.4 | 2.4 | 2.4 | 2.4 | 2.4 | 2.4 | 2.4 |
| Ultrapure water | Remnant | Remnant | Remnant | Remnant | Remnant | Remnant | Remnant | Remnant |
| Total | 100 | 100 | 100 | 100 | 100 | 100 | 100 | 100 |

| Clear ink | Ink A9 | Ink A10 | Ink A11 | Ink A12 | Ink A13 | Ink A14 | Ink A15 |
|---|---|---|---|---|---|---|---|
| 1,2-Octanediol | 3 | 3 | 3 | 3 | 3 | 3 | 3 |
| Tripropylene glycol | 18 | 6 | 6 | 6 | 12 | 12 | 18 |
| Trehalose | 36 | 12 | 24 | 36 | 12 | 24 | 12 |
| Glycerin | 5 | 5 | 5 | 5 | 5 | 5 | 5 |
| 1,2-Hexanediol | 1 | 1 | 1 | 1 | 1 | 1 | 1 |
| Surfactant | 0.3 | 0.3 | 0.3 | 0.3 | 0.3 | 0.3 | 0.3 |
| Copolymer (copolymerization ratio 5:5) of free type N,N-diallylmethylamine and carbamoylated allylamine | 2.4 | 7.2 | 7.2 | 7.2 | 7.2 | 7.2 | 7.2 |
| Ultrapure water | Remnant | Remnant | Remnant | Remnant | Remnant | Remnant | Remnant |
| Total | 100 | 100 | 100 | 100 | 100 | 100 | 100 |

| Clear ink | Ink A16 | Ink A17 | Ink A18 | Ink A19 | Ink A20 | Ink A21 | Ink A22 |
|---|---|---|---|---|---|---|---|
| 1,2-Octanediol | 3 | 3 | 3 | 3 | 3 | 3 | 3 |
| Tripropylene glycol | 12 | 12 | 12 | 12 | 12 | 12 | 12 |
| Trehalose | 24 | 24 | 24 | 24 | 24 | 24 | 24 |
| Glycerin | 5 | 5 | 5 | 5 | 5 | 5 | 5 |
| 1,2-Hexanediol | 1 | 1 | 1 | 1 | 1 | 1 | 1 |
| Surfactant | 0.3 | 0.3 | 0.3 | 0.3 | 0.3 | 0.3 | 0.3 |
| Modified PAA | Preparation Example 2b 7.2 | Preparation Example 2c 7.2 | Preparation Example 3 7.2 | Preparation Example 4 7.2 | Preparation Example 5 7.2 | Preparation Example 6 7.2 | Preparation Example 7 7.2 |
| Ultrapure water | Remnant | Remnant | Remnant | Remnant | Remnant | Remnant | Remnant |
| Total | 100 | 100 | 100 | 100 | 100 | 100 | 100 |

| Clear ink | Ink A23 | Ink A24 | Ink A25 | Ink A26 | Ink A27 | Ink A28 | Ink A29 |
|---|---|---|---|---|---|---|---|
| 1,2-Octanediol | 3 | 3 | 3 | 3 | 3 | 3 | 3 |
| Tripropylene glycol | 12 | 12 | 12 | 12 | 12 | 12 | 12 |
| Trehalose | 24 | 24 | 24 | 24 | 24 | 24 | 24 |
| Glycerin | 5 | 5 | 5 | 5 | 5 | 5 | 5 |
| 1,2-Hexanediol | 1 | 1 | 1 | 1 | 1 | 1 | 1 |
| Surfactant | 0.3 | 0.3 | 0.3 | 0.3 | 0.3 | 0.3 | 0.3 |
| Modified PAA | Preparation Example 8 7.2 | Preparation Example 9 7.2 | Preparation Example 10 7.2 | Preparation Example 11 7.2 | Preparation Example 12 7.2 | Preparation Example 13 7.2 | Preparation Example 14 7.2 |
| Ultrapure water | Remnant | Remnant | Remnant | Remnant | Remnant | Remnant | Remnant |
| Total | 100 | 100 | 100 | 100 | 100 | 100 | 100 |

| Clear ink | Ink B1 | Ink B2 | Ink B3 | Ink B4 | Ink B5 | Ink B6 | Ink B7 | Ink B8 |
|---|---|---|---|---|---|---|---|---|
| 1,2-Octanediol | — | — | — | — | — | 3 | — | 3 |
| Tripropylene glycol | 12 | 12 | 12 | 12 | 12 | 12 | 12 | 12 |
| Trehalose | 24 | 24 | 24 | 24 | 24 | 24 | 24 | — |
| Glycerin | 5 | 5 | 5 | 5 | 5 | 5 | 5 | 5 |
| 1,2-Hexanediol | 1 | 1 | 1 | 1 | 1 | 1 | 1 | 1 |
| Surfactant (polyorganosiloxane-based) | 0.3 | — | — | — | — | 0.3 | 0.3 | 0.3 |

TABLE 1-continued

| | | | | | | | | |
|---|---|---|---|---|---|---|---|---|
| Surfactant (Surfynol 104) | — | 0.3 | — | — | — | — | — | — |
| Surfactant (Surfynol 465) | — | — | 0.3 | — | — | — | — | — |
| Surfactant (BYK 347) | — | — | — | 0.3 | — | — | — | — |
| Surfactant (BYK 348) | — | — | — | — | 0.3 | — | — | — |
| Copolymer (copolymerization ratio 5:5) of free type N,N-diallylmethylamine and carbamoylated allylamine | 2.4 | 2.4 | 2.4 | 2.4 | 2.4 | — | — | 2.4 |
| AQUACER593 (40% solid content) | — | — | — | — | — | 6 | 6 | — |
| Ultrapure water | Remnant | Remnant | Remnant | Remnant | Remnant | Remnant | Remnant | Remnant |
| Total | 100 | 100 | 100 | 100 | 100 | 100 | 100 | 100 |

| Clear ink | Ink A30 | Ink A31 | Ink A32 | Ink A33 | Ink A34 | Ink A35 | Ink A36 | Ink A37 |
|---|---|---|---|---|---|---|---|---|
| 1,2-Octanediol | 3 | 3 | 3 | 3 | 3 | 3 | 3 | 3 |
| Triethylene glycol monomethyl ether | 6 | 6 | 6 | 12 | 12 | 12 | 18 | 18 |
| Trehalose | 12 | 24 | 36 | 12 | 24 | 36 | 12 | 24 |
| 1,6-Hexanediol | 1 | 1 | 1 | 1 | 1 | 1 | 1 | 1 |
| Surfactant | 0.3 | 0.3 | 0.3 | 0.3 | 0.3 | 0.3 | 0.3 | 0.3 |
| Copolymer (copolymerization ratio 5:5) of free type N,N-diallylmethylamine and carbamoylated allylamine | 2.4 | 2.4 | 2.4 | 2.4 | 2.4 | 2.4 | 2.4 | 2.4 |
| Ultrapure water | Remnant | Remnant | Remnant | Remnant | Remnant | Remnant | Remnant | Remnant |
| Total | 100 | 100 | 100 | 100 | 100 | 100 | 100 | 100 |

| Clear ink | Ink A38 | Ink A39 | Ink A40 | Ink A41 | Ink A42 | Ink A43 | Ink A44 |
|---|---|---|---|---|---|---|---|
| 1,2-Octanediol | 3 | 3 | 3 | 3 | 3 | 3 | 3 |
| Triethylene glycol monomethyl ether | 18 | 6 | 6 | 6 | 12 | 12 | 18 |
| Trehalose | 36 | 12 | 24 | 36 | 12 | 24 | 12 |
| 1,6-Hexanediol | 1 | 1 | 1 | 1 | 1 | 1 | 1 |
| Surfactant | 0.3 | 0.3 | 0.3 | 0.3 | 0.3 | 0.3 | 0.3 |
| Copolymer (copolymerization ratio 5:5) of free type N,N-diallylmethylamine and carbamoylated allylamine | 2.4 | 2.4 | 2.4 | 2.4 | 2.4 | 2.4 | 2.4 |
| Ultrapure water | Remnant | Remnant | Remnant | Remnant | Remnant | Remnant | Remnant |
| Total | 100 | 100 | 100 | 100 | 100 | 100 | 100 |

| Clear ink | Ink A45 | Ink A46 | Ink A47 | Ink A48 | Ink A49 | Ink A50 | Ink A51 |
|---|---|---|---|---|---|---|---|
| 1,2-Octanediol | 3 | 3 | 3 | 3 | 3 | 3 | 3 |
| Triethylene glycol monomethyl ether | 12 | 12 | 12 | 12 | 12 | 12 | 12 |
| Trehalose | 24 | 24 | 24 | 24 | 24 | 24 | 24 |
| 1,6-Hexanediol | 1 | 1 | 1 | 1 | 1 | 1 | 1 |
| Surfactant | 0.3 | 0.3 | 0.3 | 0.3 | 0.3 | 0.3 | 0.3 |
| Modification PAA | Preparation Example 2b 7.2 | Preparation Example 2c 7.2 | Preparation Example 3 7.2 | Preparation Example 4 7.2 | Preparation Example 5 7.2 | Preparation Example 6 7.2 | Preparation Example 7 7.2 |
| Ultrapure water | Remnant | Remnant | Remnant | Remnant | Remnant | Remnant | Remnant |
| total | 100 | 100 | 100 | 100 | 100 | 100 | 100 |

| Clear ink | Ink A52 | Ink A53 | Ink A54 | Ink A55 | Ink A56 | Ink A57 | Ink A58 |
|---|---|---|---|---|---|---|---|
| 1,2-Octanediol | 3 | 3 | 3 | 3 | 3 | 3 | 3 |
| Triethylene glycol monomethyl ether | 12 | 12 | 12 | 12 | 12 | 12 | 12 |
| Trehalose | 24 | 24 | 24 | 24 | 24 | 24 | 24 |
| 1,6-Hexanediol | 1 | 1 | 1 | 1 | 1 | 1 | 1 |
| Surfactant | 0.3 | 0.3 | 0.3 | 0.3 | 0.3 | 0.3 | 0.3 |
| Modification PAA | Preparation Example 8 7.2 | Preparation Example 9 7.2 | Preparation Example 10 7.2 | Preparation Example 11 7.2 | Preparation Example 12 7.2 | Preparation Example 13 7.2 | Preparation Example 14 7.2 |
| Ultrapure water | Remnant | Remnant | Remnant | Remnant | Remnant | Remnant | Remnant |
| total | 100 | 100 | 100 | 100 | 100 | 100 | 100 |

TABLE 1-continued

| Clear ink | Ink B9 | Ink B10 | Ink B11 | Ink B12 | Ink B13 | Ink B14 | Ink B15 | Ink B16 |
|---|---|---|---|---|---|---|---|---|
| 1,2-Octanediol | — | — | — | — | — | 3 | — | 3 |
| Triethylene glycol monomethyl ether | 12 | 12 | 12 | 12 | 12 | 12 | 12 | 12 |
| Trehalose | 24 | 24 | 24 | 24 | 24 | 24 | 24 | — |
| 1,6-Hexanediol | 1 | 1 | 1 | 1 | 1 | 1 | 1 | 1 |
| Surfactant (polyorganosiloxane-based) | 0.3 | — | — | — | — | 0.3 | 0.3 | 0.3 |
| Surfactant (Surfynol 104) | — | 0.3 | — | — | — | — | — | — |
| Surfactant (Surfynol 465) | — | — | 0.3 | — | — | — | — | — |
| Surfactant (BYK 347) | — | — | — | 0.3 | — | — | — | — |
| Surfactant (BYK 348) | — | — | — | — | 0.3 | — | — | — |
| Copolymer (copolymerization ratio 5:5) of free type N,N-diallylmethylamine and carbamoylated allylamine | 2.4 | 2.4 | 2.4 | 2.4 | 2.4 | — | — | 2.4 |
| AQUACER593 (40% solid content) | — | — | — | — | — | 6 | 6 | — |
| Ultrapure water | Remnant | Remnant | Remnant | Remnant | Remnant | Remnant | Remnant | Remnant |
| Total | 100 | 100 | 100 | 100 | 100 | 100 | 100 | 100 |

Modified PAA in Examples is one prepared as described in corresponding Preparation Example.

Preparation of Colorant-Containing Ink Composition (Ink C1 to C8)

Respective ink compositions were prepared by mixing respective components according to compositions of Table 2, and filtering with a 10 μm membrane filter. Values of Table 2 represent content in ink (% by mass). An oxyethylacrylate-based resin (oxyethyl resin) of Table 2 contains a monomer with oxyethyl acrylate structure represented by CAS No. 72009-86-0, in which the resin has a monomer configuration ratio of 75% by mass and a molecular weight of 6900.

A fluorene-based resin (fluorene resin) fluorene contains a monomer with fluorene backbone represented by CAS No. 117344-32-8, in which the resin has a monomer configuration ratio of 50% by mass and a molecular weight of 3300.

A styrene acrylic-based resin (styrene acrylic resin) used a copolymer which has a molecular weight of 1600, and acidity of 150.

A surfactant thus used is a polyorganosiloxane-based surfactant. The surfactant consists of a compound where, in the formula (I), R is a methyl group, a is an integer of 6 to 18, m is an inter of 0, n is an integer of 1; a compound where, in the formula (I), R is a hydrogen atom, a is an integer of 7 to 11, m is an inter of 30 to 50, n is an integer of 3 to 5; a compound where, in the formula (I), R is a methyl group, a is an integer of 9 to 13, m is an inter of 2 to 4, n is an integer of 1 to 2. In the case of an aqueous solution containing 20% by mass of glycerin, 10% by mass of 1,2-hexanediol, 0.1% by mass of the surfactant and 69.9% by mass of water, a dynamic surface tension of the aqueous solution at 1 Hz was 26 mN/m or less. Specifically a dynamic surface tension at 1 Hz (=One bubble/second) was measured using a Bubble Pressure Tensiometer BP2 (manufactured by KRUSS GmbH) so that the dynamic surface tension at 1 Hz in the aqueous solution was 24.6 mN/m.

Tripropylene glycol is tripropylene glycol manufactured by Asahi Kasei Chemicals Corp. Trehalose is TREHA fine powder manufactured by Hayashibara Shoji Inc. Triethylene glycol monomethyl ether is Highmol™ manufactured by Toho Chemical Industries Ltd.

TABLE 2

| | | Ink C1 Lc | Ink C2 Y | Ink C3 K | Ink C4 Lm |
|---|---|---|---|---|---|
| 1,2-Octanediol | | 2 | 2 | 2 | 2 |
| Tripropylene glycol | | 6 | 6 | 6 | 6 |
| Trehalose | | 12 | 12 | 12 | 12 |
| Glycerin | | 5 | 5 | 5 | 5 |
| 1,2-Hexanediol | | 1 | 1 | 1 | 1 |
| Surfactant | | 0.3 | 0.3 | 0.3 | 0.3 |
| Dispersion | Oxyethyl resin | 0.4 | 1.4 | 2.8 | 0.4 |
| | Fluorene resin | 0.4 | 1.4 | 2.8 | 0.4 |
| | Pigment | 2 | 7 | 7 | 2 |
| Ultrapure water | | Remnant | Remnant | Remnant | Remnant |
| Total | | 100 | 100 | 100 | 100 |

| | | Ink C5 Lc | Ink C6 Y | Ink C7 K | Ink C8 Lm |
|---|---|---|---|---|---|
| 1,2-Octanediol | | 1.0 | 1.0 | 1.0 | 1.0 |
| Triethylene glycol monomethyl ether | | 6.0 | 6.0 | 6.0 | 6.0 |
| Trehalose | | 12.0 | 12.0 | 12.0 | 12.0 |
| Surfactant | | 0.3 | 0.3 | 0.3 | 0.3 |
| Dispersion | Styrene acrylic resin | 0.4 | 1.4 | 2.8 | 0.4 |
| | Fluorine resin | 0.4 | 1.4 | 2.8 | 0.4 |
| | 1,6-Hexanediol | 0.2 | 0.7 | 1.4 | 0.2 |
| | Pigment | 2.0 | 7.0 | 7.0 | 2.0 |
| Water | | Remnant | Remnant | Remnant | Remnant |
| Total | | 100 | 100 | 100 | 100 |

Table 2 shows an ink composition where "Y" contains C.I. Pigment Yellow 74 as a pigment, "Lm" contains C.I. Pigment Violet 19 as a pigment, "Lc" contains C.I. Pigment Blue 15:3 as a pigment, and "K" contains C.I. Pigment Black 7 as a pigment, which are contained in the following ink set.

1. Evaluation of Recording Matter in Printing Paper
1-1. Evaluation of Ink Beading (Image Quality) (Beading Property)

Respective ink compositions of the above-prepared ink Y, K, Lc ("Y" uses ink C2 in Table 2, "K" uses ink C3 in Table 2, "Lc" uses ink C1 in Table 2) and clear ink (hereinafter, simply referred to as "CL") were mounted into the ink cartridge of the inkjet printer (PX-20000, manufactured from SEIKO EPSON corporation) to have Y/Y/K/K/Lc/Lc/CL/CL in an order from nozzle array of a cap side. The printer has a wiper which divides nozzle every two lines in an order from nozzle array of cap side, but the wiper of clear ink does not wipe nozzle array of the colored ink. The printer was modified by attaching a platen heater capable of controlling temperature so as to heat a recording medium at the recording position.

The voltage applied to a piezo element of the printer head was adjusted such that the dot size at the time of landing was about 3 ng, and a dot gap due to one main scanning was set so as to have 360×720 dpi. Clear ink and inks C1 to C3 were applied on OKT+ of about 128 g/m² (manufactured by Oji Paper Co., Ltd.) and an image was recorded at 720×1440 dpi as a resolution. In this time, the adhesion amount of ink of monochromatic colors of duty 100% was about 3.1 mg/inch².

Herein, "Duty" is a value calculated by the following formula.

Duty(%)=actual recording dot number/(longitudinal resolution×lateral resolution)×100

(in formula, "actual recording dot number" is actual recording dot number per unit area, "longitudinal resolution" and "lateral resolution" are resolution per unit area respectively.) In addition, the distance between the recording sheet and the recording head was 1 mm.

Recording of an image was performed under conditions of 25° C. and 45% RH. Clear ink (average dot size: 50 μm) was applied in Duty 20% or Duty 40%, by heating in Examples 1 to 29 and Comparative Examples 30 to 38 in Table 3. The heating process was performed by the heated platen at 42° C. Then, an image of a second color blending monochromatic colors of the same duty on the platen was formed and evaluated on the applied clear link using inks C1 to C3.

Therefore, for example "100% duty as a second color" means that a different two monochromatic color inks are respectively recorded in 50% Duty. As a result of calculating coverage with the clear ink of the evaluation, it was 63% (Duty 20%) and 126% (Duty 40%). The "image of second color" means an image recorded in whole combination (combination of three kinds) of C1 to C3.

The resultant image was evaluated in accordance with the following criteria. Results are shown in Table 3. It is the same as an evaluation result on a case where ink C3 was replaced with ink C4.
S: Image can be reproduced to 200% duty as second color without beading.
AA: Image can be reproduced to 180% duty as second color without beading.
A: Image can be reproduced to 160% duty as second color without beading.
B: Image can be reproduced to 140% duty as second color without beading.
C: Image can be reproduced to 120% duty as second color without beading.

1-2. Evaluation of Dot Size

An image was recorded in the same manner as in (1-1) evaluation of ink beading, except that resolution and Duty of inks C1 to C3 were changed.

Specifically, dot gap due to one main scanning was set so as to have 720×360 dpi, image of inks C1 to C3 was recorded as 1% Duty at 720×720 dpi dpi as a resolution. In this time, the adhesion amount of ink of monochromatic colors of duty 100% was about 1.6 mg/inch².

The resultant image was evaluated in accordance with the following criteria. Results are shown in Table 3. It is the same as an evaluation result in a case where ink C3 was replaced with ink C4.
S: dot size is lower than 40 micron.
AA: dot size is equal to or higher than 40 microns and lower than 50 microns.
A: dot size is equal to or higher than 50 microns and lower than 60 microns.
B: dot size is equal to or higher than 60 microns and lower than 70 microns.
C: dot size is equal to or higher than 70 microns.

1-3. Evaluation of Curl

An image was recorded in the same manner as in 1-1. evaluation of ink beading, except that a recording medium, resolution, Duty of inks C1 and recording image were changed.

Specifically, as a recording medium, OKT+ of about 73.3 g/m² (manufactured by Oji Paper Co., Ltd.) and XeroxP of 60 g/m² (manufactured by Fujixerox) were used. A dot gap due to one main scanning was set so as to have 360×720 dpi, a solid image of peripheral 6-mm blank of inks C1 was recorded as 100% Duty at 720×720 dpi dpi as a resolution. In this time, the adhesion amount of ink of monochromatic colors of duty 100% was about 1.6 mg/inch².

The resultant image was evaluated in accordance with the following criteria. Results are shown in Table 3. It is the same as an evaluation result in a case where ink C1 was replaced with any of inks C2 to C4.
With respect to two kinds of the recording sheet, average value of curling to edges of four corners of recording paper from a desk were measured and calculated, average value (OKT+) and average (XeroxP). With respect to average values of curling of the resultant two kinds of recording sheet, a further average value (ALL) was calculated, and used as an index for evaluation.
AA: The average value (ALL) is equal to or lower than 5 mm.
A: The average value (ALL) is equal to or lower than 10 mm.
B: The average value (ALL) is equal to or higher than 10 mm and equal to or lower than 20 mm.
C: The average value (ALL) is equal to or higher than 20 mm.

TABLE 3

|  |  | Example 1 | Example 2 | Example 3 | Example 4 | Example 5 | Example 6 | Example 7 | Example 8 |
|---|---|---|---|---|---|---|---|---|---|
| Clear ink |  | Ink A1 | Ink A2 | Ink A3 | Ink A4 | Ink A5 | Ink A6 | Ink A7 | Ink A8 |
| Evaluation of Beading property | Heating temperature: 42° C. | S | S | S | S | S | S | S | S |
| Evaluation of dot size | CL ink: Duty 40% | AA | AA | AA | AA | AA | AA | AA | AA |
| Evaluation of curl property |  | A | AA | AA | A | AA | AA | AA | AA |
| Evaluation of beading property | Heating temperature: 42° C. | S | S | S | S | S | S | S | S |

TABLE 3-continued

| | | | | | | | | |
|---|---|---|---|---|---|---|---|---|
| Evaluation dot size | CL ink: Duty 20% | AA | AA | AA | AA | AA | AA | AA | AA |
| Evaluation of curl property | | B | A | A | B | A | A | A | A |

| | | Example 9 | Example 10 | Example 11 | Example 12 | Example 13 | Example 14 | Example 15 |
|---|---|---|---|---|---|---|---|---|
| Clear ink | | Ink A9 | Ink A10 | Ink A11 | Ink A12 | Ink A13 | Ink A14 | Ink A15 |
| Evaluation of Beading property | Heating temperature: 42° C. | S | S | S | S | S | S | S |
| Evaluation of dot size | CL ink: Duty 40% | AA | S | S | S | S | S | S |
| Evaluation of curl property | | AA | A | AA | AA | A | AA | AA |
| Evaluation of beading property | Heating temperature: 42° C. | S | S | S | S | S | S | S |
| Evaluation dot size | CL ink: Duty 20% | AA | S | S | S | S | S | S |
| Evaluation of curl property | | A | B | A | A | B | A | A |

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Clear ink | | Ink A1 | Ink A2 | Ink A3 | Ink A4 | Ink A5 | Ink A6 | Ink A7 | Ink A8 |
| Evaluation of Beading property | no heating CL ink: | AA | AA | AA | AA | AA | AA | AA | AA |
| Evaluation of dot size | Duty 40% | AA | AA | AA | AA | AA | AA | AA | AA |
| Evaluation of curl property | | A | AA | AA | A | AA | AA | AA | AA |
| Evaluation of beading property | no heating CL ink: | AA | AA | AA | AA | AA | AA | AA | AA |
| Evaluation dot size | Duty 20% | AA | AA | AA | AA | AA | AA | AA | AA |
| Evaluation of curl property | | B | A | A | B | A | A | A | A |

| | | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|
| Clear ink | | Ink A9 | Ink A10 | Ink A11 | Ink A12 | Ink A13 | Ink A14 | Ink A15 |
| Evaluation of Beading property | no heating CL ink: | AA | AA | AA | AA | AA | AA | AA |
| Evaluation of dot size | Duty 40% | AA | S | S | S | S | S | S |
| Evaluation of curl property | | AA | A | AA | AA | A | AA | AA |
| Evaluation of beading property | no heating CL ink: | AA | AA | AA | AA | AA | AA | AA |
| Evaluation dot size | Duty 20% | AA | S | S | S | S | S | S |
| Evaluation of curl property | | A | B | A | A | B | A | A |

| | | Example 16 | Example 17 | Example 18 | Example 19 | Example 20 | Example 21 | Example 22 |
|---|---|---|---|---|---|---|---|---|
| Clear ink | | Ink A16 | Ink A17 | Ink A18 | Ink A19 | Ink A20 | Ink A21 | Ink A22 |
| Evaluation of Beading property | Heating temperature: 42° C. | S | S | S | S | S | S | S |
| Evaluation of dot size | CL ink: Duty 40% | S | S | S | S | S | S | S |
| Evaluation of curl property | | AA | AA | AA | AA | AA | AA | AA |
| Evaluation of beading property | Heating temperature: 42° C. | S | S | S | S | S | S | S |
| Evaluation dot size | CL ink: Duty 20% | S | S | S | S | S | S | S |
| Evaluation of curl property | | A | A | A | A | A | A | A |

| | | Example 23 | Example 24 | Example 25 | Example 26 | Example 27 | Example 28 | Example 29 |
|---|---|---|---|---|---|---|---|---|
| Clear ink | | Ink A23 | Ink A24 | Ink A25 | Ink A26 | Ink A27 | Ink A28 | Ink A29 |
| Evaluation of Beading property | Heating temperature: 42° C. | S | S | S | S | S | S | S |

TABLE 3-continued

|  |  | | | | | | | |
|---|---|---|---|---|---|---|---|---|
| Evaluation of dot size | CL ink: Duty 40% | S | S | S | S | S | S | S |
| Evaluation of curl property | | AA | AA | AA | AA | AA | AA | AA |
| Evaluation of beading property | Heating temperature: 42° C. | S | S | S | S | S | S | S |
| Evaluation dot size | CL ink: Duty 20% | S | S | S | S | S | S | S |
| Evaluation of curl property | | A | A | A | A | A | A | A |

|  |  | Comparative Example 16 | Comparative Example 17 | Comparative Example 18 | Comparative Example 19 | Comparative Example 20 | Comparative Example 21 | Comparative Example 22 |
|---|---|---|---|---|---|---|---|---|
| Clear ink | | Ink A16 | Ink A17 | Ink A18 | Ink A19 | Ink A20 | Ink A21 | Ink A22 |
| Evaluation of Beading property | no heating CL ink: | AA | AA | AA | AA | AA | AA | AA |
| Evaluation of dot size | Duty 40% | S | S | S | S | S | S | S |
| Evaluation of curl property | | AA | AA | AA | AA | AA | AA | AA |
| Evaluation of beading property | no heating CL ink: | AA | AA | AA | AA | AA | AA | AA |
| Evaluation dot size | Duty 20% | S | S | S | S | S | S | S |
| Evaluation of curl property | | A | A | A | A | A | A | A |

|  |  | Comparative Example 23 | Comparative Example 24 | Comparative Example 25 | Comparative Example 26 | Comparative Example 27 | Comparative Example 28 | Comparative Example 29 |
|---|---|---|---|---|---|---|---|---|
| Clear ink | | Ink A23 | Ink A24 | Ink A25 | Ink A26 | Ink A27 | Ink A28 | Ink A29 |
| Evaluation of Beading property | no heating CL ink: | AA | AA | AA | AA | AA | AA | AA |
| Evaluation of dot size | Duty 40% | S | S | S | S | S | S | S |
| Evaluation of curl property | | AA | AA | AA | AA | AA | AA | AA |
| Evaluation of beading property | no heating CL ink: | AA | AA | AA | AA | AA | AA | AA |
| Evaluation dot size | Duty 20% | S | S | S | S | S | S | S |
| Evaluation of curl property | | A | A | A | A | A | A | A |

|  |  | Comparative Example 30 | Comparative Example 31 | Comparative Example 32 | Comparative Example 33 | Comparative Example 34 | Comparative Example 35 | Comparative Example 36 | Comparative Example 37 |
|---|---|---|---|---|---|---|---|---|---|
| Clear ink | | Ink B1 | Ink B2 | Ink B3 | Ink B4 | Ink B5 | Ink B6 | Ink B7 | Ink B8 |
| Evaluation of Beading property | Heating temperature: 42° C. CL ink: | C | C | C | C | C | A | C | A |
| Evaluation of dot size | Duty 40 % | B | B | B | B | B | C | C | B |
| Evaluation of curl property | | AA | AA | AA | AA | AA | AA | AA | A |
| Evaluation of beading property | Heating temperature: 42° C. CL ink: | C | C | C | C | C | A | C | A |
| Evaluation dot size | Duty 20% | B | B | B | B | B | C | C | B |
| Evaluation of curl property | | A | A | A | A | A | A | A | B |

|  |  | Comparative Example 38 | Comparative Example 39 | Comparative Example 40 | Comparative Example 41 | Comparative Example 42 | Comparative Example 43 | Comparative Example 44 | Comparative Example 45 |
|---|---|---|---|---|---|---|---|---|---|
| Clear ink | | Ink B1 | Ink B2 | Ink B3 | Ink B4 | Ink B5 | Ink B6 | Ink B7 | Ink B8 |
| Evaluation of Beading property | no heating CL ink: | C | C | C | C | C | B | C | B |
| Evaluation of dot size | Duty 40% | B | B | B | B | B | C | C | B |
| Evaluation of curl property | | AA | AA | AA | AA | AA | AA | AA | A |
| Evaluation of beading property | no heating CL ink: | C | C | C | C | C | B | C | B |

TABLE 3-continued

| Evaluation dot size | Duty 20% | B | B | B | B | B | C | C | B |
|---|---|---|---|---|---|---|---|---|---|
| Evaluation of curl property | | A | A | A | A | A | A | A | B |

2. Evaluation of Recording Matter in Film 2-1. Evaluation of Ink Beading (Image Quality) in Film (Beading Property)

Respective ink compositions of the above-prepared ink Y, K, Lc ("Y" uses ink C6 in Table 2, "K" uses ink C7 in Table 2, "Lc" uses ink C5 in Table 2) and clear ink (hereinafter, simply referred to as "CL") were mounted into the ink cartridge of the inkjet printer (PX-20000, manufactured from SEIKO EPSON corporation) to have Y/Y/K/K/Lc/Lc/CL/CL in an order from nozzle array of a cap side. The printer has a wiper which divides nozzle every two lines in an order from nozzle array of cap side, but the wiper of clear ink does not wipe nozzle array of the colored ink. The printer was modified by attaching a platen heater capable of controlling temperature so as to heat a recording medium at the recording position.

The voltage applied to a piezo element of the printer head was adjusted such that the dot size at the time of landing was about 3 ng, and dot gap due to one main scanning was set so as to have 360×720 dpi. Clear ink and inks C5 to C7 were applied on a Rumira S10 (100 micron thickness) (manufactured by Toray Corporation) and an image was recorded at 720×1440 dpi as a resolution. At this time, the adhesion amount of ink of monochromatic colors of duty 100% was about 3.1 mg/inch².

Herein, "Duty" is a value calculated by the following formula.

Duty(%)=actual recording dot number/(longitudinal resolution×lateral resolution)×100

(in the formula, "actual recording dot number" is the actual recording dot number per unit area, "longitudinal resolution" and "lateral resolution" are resolution per unit area respectively.) In addition, the distance between the recording sheet and the recording head was 1 mm.

Recording of image was performed under conditions of 25° C. and 45% RH. Clear ink (average dot size: 50 μm) was applied in Duty 20% or Duty 40%, by heating in Examples 30 to 58 and Comparative Examples 77 to 85 in Table 4. The heating process was performed by the heated platen at 42° C. Then, image of a second color blending monochromatic colors of the same duty on the platen was formed and evaluated on the applied clear ink composition using inks C5 to C7.

Therefore, for example "100% duty as a second color" means that different two monochromatic color inks are respectively recorded in 50% Duty. As a result of calculating coverage with the clear ink of the evaluation, it was 63% (Duty 20%) and 126% (Duty 40%). The "image of second color" means image recorded in whole combination (combination of three kinds) of C5 to C7.

The resultant image was evaluated in accordance with the following criteria. Results are shown in Table 4. It is the same as an evaluation result in a case where ink C7 was replaced with ink C8

S: Image can be reproduced to 200% duty as second color without beading.

AA: Image can be reproduced to 180% duty as second color without beading.

A: Image can be reproduced to 160% duty as second color without beading.

B: Image can be reproduced to 140% duty as second color without beading.

C: Image can be reproduced to 120% duty as second color without beading.

2-2 Evaluation of Film Line Width

An image was recorded in the same manner as in (2-1) evaluation of ink beading, except that resolution and a recording image were changed.

Specifically, a dot gap due to one main scanning was set so as to have 720×360 dpi, an image was recorded as 100% Duty at 720×180 dpi as a resolution in the main scanning direction. At this time, the adhesion amount of ink of monochromatic colors of duty 100% was about 0.4 mg/inch².

The resulting lines were evaluated in accordance with the following criteria. The results are shown in Table 4. It is the same as an evaluation result on a case where ink C7 was replaced with any of ink C8

A: line width is equal to or more than 60 microns and less than 70 microns

B: line width is equal to or more than 70 microns.

C: line width was not uniform, due to film peeling

TABLE 4

| | | Example 30 | Example 31 | Example 32 | Example 33 | Example 34 | Example 35 | Example 36 | Example 37 |
|---|---|---|---|---|---|---|---|---|---|
| Clear ink | | Ink A30 | Ink A31 | Ink A32 | Ink A33 | Ink A34 | Ink A35 | Ink A36 | Ink A37 |
| Film line width | Heating temperature: 42° C. | AA | AA | AA | AA | AA | AA | AA | AA |
| Beading property | CL ink: Duty 20% | S | S | S | S | S | S | S | S |

| | | Example 38 | Example 39 | Example 40 | Example 41 | Example 42 | Example 43 | Example 44 |
|---|---|---|---|---|---|---|---|---|
| Clear ink | | Ink A38 | Ink A39 | Ink A40 | Ink A41 | Ink A42 | Ink A43 | Ink A44 |
| Film line width | Heating temperature: 42° C. | AA | S | S | S | S | S | S |
| Beading property | CL ink: Duty 20% | S | S | S | S | S | S | S |

TABLE 4-continued

|  |  | Comparative Example 46 | Comparative Example 47 | Comparative Example 48 | Comparative Example 49 | Comparative Example 50 | Comparative Example 51 | Comparative Example 52 | Comparative Example 53 |
|---|---|---|---|---|---|---|---|---|---|
| Clear ink |  | Ink A30 | Ink A31 | Ink A32 | Ink A33 | Ink A34 | Ink A35 | Ink A36 | Ink A37 |
| Film line width | No heating CL ink: | AA | AA | AA | AA | AA | AA | AA | AA |
| Beading property | Duty 20% | AA | AA | AA | AA | AA | AA | AA | AA |

|  |  | Comparative Example 54 | Comparative Example 55 | Comparative Example 56 | Comparative Example 57 | Comparative Example 58 | Comparative Example 59 | Comparative Example 60 |
|---|---|---|---|---|---|---|---|---|
| Clear ink |  | Ink A38 | Ink A39 | Ink A40 | Ink A41 | Ink A42 | Ink A43 | Ink A44 |
| Film line width | No heating CL ink: | AA | S | S | S | S | S | S |
| Beading property | Duty 20% | AA | AA | AA | AA | AA | AA | AA |

|  |  | Example 45 | Example 46 | Example 47 | Example 48 | Example 49 | Example 50 | Example 51 |
|---|---|---|---|---|---|---|---|---|
| Clear ink |  | Ink A45 | Ink A46 | Ink A47 | Ink A48 | Ink A49 | Ink A50 | Ink A51 |
| Film line width | Heating temperature: 42° C. | S | S | S | S | S | S | S |
| Beading property | CL ink: Duty 20% | S | S | S | S | S | S | S |

|  |  | Example 52 | Example 53 | Example 54 | Example 55 | Example 56 | Example 57 | Example 58 |
|---|---|---|---|---|---|---|---|---|
| Clear ink |  | Ink A52 | Ink A53 | Ink A54 | Ink A55 | Ink A56 | Ink A57 | Ink A58 |
| Film line width | Heating temperature: 42° C. | S | S | S | S | S | S | S |
| Beading property | CL ink: Duty 20% | S | S | S | S | S | S | S |

|  |  | Comparative Example 61 | Comparative Example 62 | Comparative Example 63 | Comparative Example 64 | Comparative Example 65 | Comparative Example 66 | Comparative Example 67 |
|---|---|---|---|---|---|---|---|---|
| Clear ink |  | Ink A45 | Ink A46 | Ink A47 | Ink A48 | Ink A49 | Ink A50 | Ink A51 |
| Film line width | No heating CL ink: | S | S | S | S | S | S | S |
| Beading property | Duty 20% | AA | AA | AA | AA | AA | AA | AA |

|  |  | Comparative Example 68 | Comparative Example 69 | Comparative Example 70 | Comparative Example 71 | Comparative Example 72 | Comparative Example 73 | Comparative Example 74 |
|---|---|---|---|---|---|---|---|---|
| Clear ink |  | Ink A52 | Ink A53 | Ink A54 | Ink A55 | Ink A56 | Ink A57 | Ink A58 |
| Film line width | No heating CL ink: | S | S | S | S | S | S | S |
| Beading property | Duty 20% | AA | AA | AA | AA | AA | AA | AA |

|  |  | Comparative Example 75 | Comparative Example 76 | Comparative Example 77 | Comparative Example 78 | Comparative Example 79 | Comparative Example 80 | Comparative Example 81 | Comparative Example 82 |
|---|---|---|---|---|---|---|---|---|---|
| Clear ink |  | Ink B9 | Ink B10 | Ink B11 | Ink B12 | Ink B13 | Ink B14 | Ink B15 | Ink B16 |
| Film line width | Heating temperature: 42° C. | B | B | B | B | B | C | C | B |
| Beading property | CL ink: Duty 20% | C | C | C | C | C | A | C | A |

TABLE 4-continued

| | | Comparative Example 83 | Comparative Example 84 | Comparative Example 85 | Comparative Example 86 | Comparative Example 87 | Comparative Example 88 | Comparative Example 89 | Comparative Example 90 |
|---|---|---|---|---|---|---|---|---|---|
| Clear ink | | Ink B9 | Ink B10 | Ink B11 | Ink B12 | Ink B13 | Ink B14 | Ink B15 | Ink B16 |
| Film line width | No heating CL ink: | B | B | B | B | B | C | C | B |
| Beading property | Duty 20% | C | C | C | C | C | B | C | B |

What is claimed is:

1. An inkjet recording method using a clear ink composition, comprising:

applying the clear ink composition; and heating the applied clear ink composition, wherein the clear ink composition contains an amino group-containing resin, water, a sparingly water soluble alkanediol, a wetting agent which is solid at 20° C. and 60% relative humidity, and (poly)oxyalkylene glycol, and the (poly)oxyalkylene glycol is one or two or more kinds selected from the group consisting of triethylene glycol, propylene glycol, dipropylene glycol, and tripropylene glycol, wherein the ratio of the sparingly water soluble alkanediol to the sum of the (poly)oxyalkylene glycol and the wetting agent is 1:5 to 1:20.

2. The method according to claim 1, wherein the wetting agent is trehalose.

3. The method according to claim 1, wherein the sum of content of the (poly)oxyalkylene glycol and the wetting agent is equal to or more than 12.0% by mass and equal to or less than 60.0% by mass, with respect to the ink composition.

4. The method according to claim 1, wherein the amino group-containing resin is modified polyallylamine, and contains repeating units (a) and (d) as an essential constituent monomer and repeating units (b) and (c) as an optional constituent monomer, which are represented by the formula:

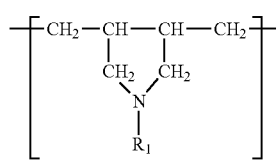

(a)

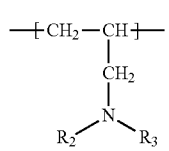

(b)

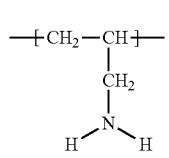

(c)

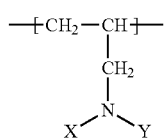

(d)

wherein,

R1, R2, and R3 each independently represent an alkyl group having 1 to 4 carbon atoms, x represents any one of the following (i) to (v);

(i) —CONH$_2$, (ii) —COOR$_4$ (R$_4$ represents an alkyl group having 1 to 12 carbon atoms, or an aryl group having 6 to 12), (iii) —COR$_5$ (R$_5$ represents an alkyl group having 1 to 12 carbon atoms), (iv) —CH$_2$CH(R$_6$)-A (R$_6$ represents a hydrogen atom or a methyl group, A is selected from a group of consisting of; CONR$_7$R$_8$ (R$_7$ and R$_8$ each independently represents a hydrogen atom or an alkyl group having 1 to 8 carbon atoms (wherein the alkyl group may be replaced with a group selected from a group consisting of a hydroxy group, a keto group, an alkylamino group having 1 to 4 carbon atoms, a di(alkyl having 1 to 4 carbon atoms)amino group, and a tri(alkyl having 1 to 4 carbon atoms) ammonium group), or NR$_7$R$_8$ which is bonded thereto is a piperidino group or a morpholino group); —CN; and COOR$_5$ (R$_9$ is selected from a group consisting of an alkyl group having 1 to 8 carbon atoms (wherein the alkyl group may be replaced with a group selected from a group consisting of a hydroxy group, a keto group, an alkylamino group having 1 to 4 carbon atoms, a di(alkyl having 1 to 4 carbon atoms)amino group, and a tri(alkyl having 1 to 4 carbon atoms)ammonium group), and (v) —CH$_2$CH(OH)—B (wherein, B represents an alkyl group having 1 to 8 carbon atoms (wherein the alkyl group may be replaced with a group selected from a group consisting of a hydroxy group, an alkoxy group having 1 to 4 carbon atoms, and an alkenyloxy group), and Y has the same meaning as the X, or represents a hydrogen atom, wherein X and Y are the same as or different every repeating unit.

5. The method according to claim 1, wherein in the ink composition, the content of the (poly)oxyalkylene glycol is equal to or more than 6% by mass and equal to or less than 18% by mass, the content of the wetting agent is equal to or more than 12% by mass and equal to or less than 36% by mass, the content of water is equal to or more than 30% by mass and equal to or less than 74% by mass, and a ratio of the sum of the (poly)oxyalkylene glycol and the wetting agent to the water is 5:3 to 1:4.

6. The method according to claim 1, wherein the heating process is preformed at 30 to 160° C.

* * * * *